US009461777B2

(12) United States Patent
Cohen et al.

(10) Patent No.: US 9,461,777 B2
(45) Date of Patent: Oct. 4, 2016

(54) HYBRID NETWORKING SYSTEM WITH SEAMLESS PATH SWITCHING OF STREAMS

(75) Inventors: Etan Gur Cohen, San Francisco, CA (US); Kai Chen, Union City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/301,562

(22) Filed: Nov. 21, 2011

(65) Prior Publication Data

US 2013/0132603 A1    May 23, 2013

(51) Int. Cl.
| | |
|---|---|
| G06F 15/173 | (2006.01) |
| H04L 1/18 | (2006.01) |
| H04L 29/06 | (2006.01) |
| H04L 12/863 | (2013.01) |
| H04L 12/911 | (2013.01) |
| H04L 12/707 | (2013.01) |
| H04L 12/729 | (2013.01) |

(52) U.S. Cl.
CPC ............. *H04L 1/1841* (2013.01); *H04L 45/22* (2013.01); *H04L 47/6225* (2013.01); *H04L 47/726* (2013.01); *H04L 69/164* (2013.01); *H04L 45/125* (2013.01); *H04L 45/24* (2013.01)

(58) Field of Classification Search
CPC .... H04L 69/164; H04L 47/726; H04L 45/22
USPC ............ 714/746–753; 370/394; 709/237
See application file for complete search history.

(56) References Cited

U.S. PATENT DOCUMENTS

| | | | |
|---|---|---|---|
| 5,309,433 A | * | 5/1994 | Cidon et al. .................. 370/390 |
| 5,627,822 A | | 5/1997 | Edmaier et al. |
| 6,370,112 B1 | | 4/2002 | Voelker |
| 6,516,000 B1 | | 2/2003 | Kshirsagar et al. |
| 6,567,929 B1 | * | 5/2003 | Bhagavath ............ H04L 12/185 370/432 |
| 6,611,942 B1 | | 8/2003 | Battistello et al. |
| 6,947,379 B1 | | 9/2005 | Gleichauf et al. |

(Continued)

FOREIGN PATENT DOCUMENTS

| | | |
|---|---|---|
| CN | 103959698 | 7/2014 |
| EP | 2061211 A1 | 5/2009 |

(Continued)

OTHER PUBLICATIONS

Co-pending U.S. Appl. No. 13/717,111, filed Dec. 17, 2012, 38 pages.

(Continued)

*Primary Examiner* — Aftab N. Khan
(74) *Attorney, Agent, or Firm* — DeLizio Law, PLLC

(57) ABSTRACT

System and method for switching a stream to a new transmission medium. A first stream may be received. A first plurality of packets of the first stream may be transmitted to a second device on a first transmission medium. The first plurality of packets may include one or more index marker packets. It may be determined that at least a portion of the first plurality of packets may not have been received by the second device. A second plurality of packets of the first stream may be transmitted to the second device on a second transmission medium. The second plurality of packets may include at least a subset of the first plurality of packets and at least a subset of the one or more index marker packets. The one or more index marker packets may be configured for use by the second device to detect and discard duplicate packets.

34 Claims, 11 Drawing Sheets

(56) References Cited

U.S. PATENT DOCUMENTS

| | | | |
|---|---|---|---|
| 6,977,888 B1* | 12/2005 | Frenger | H04L 1/1819 370/218 |
| 7,107,334 B1 | 9/2006 | Shaffer et al. | |
| 7,315,898 B2* | 1/2008 | Kohno | 709/230 |
| 7,372,865 B2 | 5/2008 | Scott et al. | |
| 7,489,866 B2 | 2/2009 | Ozugur et al. | |
| 7,606,263 B1 | 10/2009 | Parker | |
| 7,636,342 B2 | 12/2009 | Tang | |
| 7,647,616 B2* | 1/2010 | Puthiyedath | H04L 12/2697 348/192 |
| 8,279,870 B2 | 10/2012 | Flammer, III et al. | |
| 8,767,666 B2 | 7/2014 | Cheng et al. | |
| 2002/0141344 A1 | 10/2002 | Chidambaran et al. | |
| 2002/0172208 A1* | 11/2002 | Malkamaki | H04L 1/0083 370/400 |
| 2003/0210669 A1* | 11/2003 | Vayanos | H04L 1/1845 370/335 |
| 2003/0223358 A1 | 12/2003 | Rigby et al. | |
| 2004/0078624 A1* | 4/2004 | Maxemchuk | H04L 12/1868 714/4.2 |
| 2005/0240677 A1 | 10/2005 | Liu et al. | |
| 2007/0110074 A1* | 5/2007 | Bradley et al. | 370/395.51 |
| 2007/0160017 A1* | 7/2007 | Meier et al. | 370/338 |
| 2007/0286140 A1 | 12/2007 | Kwon et al. | |
| 2007/0291778 A1* | 12/2007 | Huang | H04L 1/1614 370/410 |
| 2008/0025309 A1 | 1/2008 | Swallow | |
| 2008/0060074 A1 | 3/2008 | Okuyama | |
| 2008/0072113 A1* | 3/2008 | Tsang | H04L 1/1874 714/748 |
| 2008/0094520 A1 | 4/2008 | Tkachenko et al. | |
| 2008/0219204 A1* | 9/2008 | Lee | H04L 1/1812 370/315 |
| 2008/0227403 A1 | 9/2008 | Taki | |
| 2008/0279567 A1 | 11/2008 | Huang et al. | |
| 2009/0016366 A1 | 1/2009 | Endo et al. | |
| 2009/0213779 A1 | 8/2009 | Zhang et al. | |
| 2010/0046520 A1* | 2/2010 | Nakata | H04L 1/1867 370/394 |
| 2010/0183024 A1 | 7/2010 | Gupta | |
| 2010/0226265 A1 | 9/2010 | Zhang et al. | |
| 2010/0257421 A1* | 10/2010 | Kohno | H04L 1/0014 714/748 |
| 2010/0296450 A1 | 11/2010 | Faniuolo et al. | |
| 2010/0309777 A1 | 12/2010 | Kano | |
| 2011/0080911 A1 | 4/2011 | Guichard et al. | |
| 2011/0235638 A1 | 9/2011 | Tempia Bonda | |
| 2011/0286326 A1 | 11/2011 | Awano | |
| 2012/0063319 A1 | 3/2012 | Christin et al. | |
| 2012/0071168 A1 | 3/2012 | Tomici et al. | |
| 2012/0131408 A1 | 5/2012 | Tada et al. | |
| 2012/0155256 A1 | 6/2012 | Pope et al. | |
| 2012/0173748 A1* | 7/2012 | Bouazizi | H04L 65/4084 709/231 |
| 2012/0188873 A1* | 7/2012 | Nakatsugawa | H04L 1/0003 370/231 |
| 2012/0192026 A1* | 7/2012 | Chen | H04L 1/0066 714/751 |
| 2012/0207164 A1 | 8/2012 | Tanaka | |
| 2012/0224503 A1* | 9/2012 | Schrum et al. | 370/254 |
| 2012/0236870 A1 | 9/2012 | Klein | |
| 2012/0263182 A1* | 10/2012 | Enomoto | H04L 1/1841 370/394 |
| 2012/0307748 A1 | 12/2012 | Cheng et al. | |
| 2013/0128738 A1 | 5/2013 | Cohen et al. | |
| 2013/0132604 A1 | 5/2013 | Cohen et al. | |
| 2013/0329546 A1 | 12/2013 | Wijnands | |
| 2014/0023022 A1 | 1/2014 | Cheng et al. | |
| 2014/0169383 A1 | 6/2014 | Jain et al. | |

FOREIGN PATENT DOCUMENTS

| | | |
|---|---|---|
| JP | 01258518 | 10/1989 |
| JP | 08051440 | 2/1996 |
| JP | 2001520493 | 10/2001 |
| JP | 2003273902 | 9/2003 |
| JP | 2015502711 | 1/2015 |
| KR | 1020140097417 | 8/2014 |
| WO | 2009005162 A2 | 1/2009 |
| WO | 2009074840 | 6/2009 |
| WO | 2013078226 | 5/2013 |
| WO | 2014099257 | 6/2014 |

OTHER PUBLICATIONS

Culley et al., "Marker PDU Aligned Framing for TCP Specification; draft-ietf-rddp-mpa-08.txt", 20061007, vol. rddp, No. 8, Oct. 7, 2006, XP015048063, ISSN: 9999-9004 the whole document.

International Search Report and Written Opinion—PCT/US2012/066105—ISA/EPO—Mar. 27, 2013.

"PCT Application No. PCT/US2012/066105, Written Opinion of the IPEA", Oct. 17, 2013, 5 pages.

Kitatsuji, et al., "On Handover Procedure with Data Forwarding for Reducing Buffered User Data in Base Stations", Global Telecommunications Conference, 2009. Globecom 2009. IEEE, 20091130 IEEE, Piscataway, NJ, USA—ISBN 978-1-4244-4148-8 ; ISBN 1-4244-4148-X XP031646436 Nov. 30, 2009 , pp. 1-8.

Finn, Norman , "Marker Protocol and DRNI", axbq-nfinn-marker-protocol-drni-0511-v1; IEEE Draft, vol. 802.1, No. v1 XP068008133 May 9, 2011 , 1-15.

"PCT Application No. PCT/US2013/071406 International Search Report and Written Opinion", Feb. 26, 2014 , 13 pages.

"Taiwan Application No. 102142684 TIPO Search Report", Jan. 9, 2015, 1 page.

"Taiwan Application No. 102142684, Office Action", Jan. 12, 2015, 14 pages.

"U.S. Appl. No. 13/717,111 Final Office Action", Jan. 22, 2015, 24 pages.

"U.S. Appl. No. 13/717,111 Office Action", Mar. 13, 2015, 11 pages.

"PCT Application No. PCT/US2012/066105 International Preliminary Report on Patentability", Jan. 31, 2014 , 9 pages.

"U.S. Appl. No. 13/717,111 Office Action", Sep. 4, 2014, 28 pages.

"Japanese Patent Application No. 2014-542573, Office Action", Jun. 30, 2015, 8 pages.

"U.S. Appl. No. 13/717,111 Final Office Action", Aug. 13, 2015, 14 pages.

"PCT/US2013/071406 International Preliminary Report on Patentability", Jul. 2, 2015, 9 pages.

"Japanese Patent Application No. 2014-542573, Office Action", Dec. 1, 2015, 4 pages.

"Korean Application No. 10-2014-7016864 Office Action", 6 pages, Feb. 18, 2016.

* cited by examiner

HYBRID NETWORKING SYSTEM WITH SEAMLESS PATH SWITCHING OF STREAMS

BACKGROUND

1. Field of the Disclosure

The present invention relates generally to communication systems, and more particularly to systems and methods for transmitting and receiving streams in a network including a plurality of transmission media.

2. Description of the Related Art

There are a variety of networking technologies which are currently commonly used to build communication networks. Some examples include wireless local area network (WLAN) technologies, powerline communication technologies, Ethernet, and 802.16 (WiMAX), among other networking technologies. It is even relatively common (e.g., in a household setting) for multiple such communication networks to exist in the same space. In such situations, hybrid networking devices, which can couple to other hybrid networking devices using multiple different networking technologies, thereby forming a more robust hybrid network, would be particularly useful.

However, the communication mechanisms (e.g., the transmission media), and protocol specifics (e.g., device and topology discovery, bridging to other networks, etc.) for individual networking technologies are typically unique to each networking technology. Bridging such diverse networking technologies to form an effective hybrid network is a challenging goal, and improvements in a variety of areas of hybrid networking would be desirable.

SUMMARY OF THE DISCLOSURE

Embodiments of the disclosure are presented in order to improve networking systems. More specifically, embodiments of the disclosure are directed at methods for path selection, load balancing, stream aggregation, packet loss minimization, duplicate packet detection, and out-of-order packet re-ordering, in networking systems which are capable of using multiple transmission media to transmit/receive a stream.

Some embodiments of the disclosure may be implemented by an electronic device (e.g., a first hybrid networking device) which is coupled to another electronic device (e.g., a second hybrid networking device) via a plurality of transmission media. For example, the electronic devices may be capable of communicating via multiple types of networks, of which at least some may utilize different transmission media to convey communication. Furthermore, in some embodiments, at least one of the transmission media may be substantially dynamic in nature, e.g., the PHY rate of at least one of the transmission media may vary substantially over time.

Electronic devices which are coupled to one another via a plurality of transmission media have the advantage of being capable of using any or all (or some combination) of the transmission media to communicate. However, in order to make optimal use of different transmission media and associated networking technologies, advanced control algorithms may be required. For example, some types of communications may be better suited to one type of networking technology and/or transmission medium than others. Intelligently selecting a transmission medium on which to transmit a stream from a plurality of available transmission media is a non-trivial exercise, especially when medium characteristics may change over time and must be monitored regularly. This process is referred to herein as path selection, and one set of embodiments of the disclosure relate to a system and method for path selection.

Furthermore, as stream characteristics (e.g., how much bandwidth a stream utilizes) and medium characteristics (e.g., link capacity of a transmission medium) change over time, oversubscription conditions may occur on one or more transmission media. In addition, under some circumstances a transmission medium may temporarily or permanently fail. Balancing the various streams which are being communicated between electronic devices over multiple transmission media in order to optimize use of available network capacity while avoiding oversubscription and providing appropriate service to various types of content streams is accordingly another important aspect of this disclosure. The process of monitoring the various transmission media and selecting and moving one or more streams from one transmission medium to another transmission medium in order to optimize use of the various transmission media is referred to herein as load balancing, and one set of embodiments of the disclosure relate to a system and method for load balancing.

The availability of multiple transmission media for communicating also lends itself to the possibility of transmitting a stream using multiple transmission media. For example, in some situations, a communication stream may have a bandwidth requirement which is larger than can be sustained in its entirety by any single transmission media. This may occur in cases of very large streams, or, possibly more commonly, if a number of streams are already being communicated on each transmission medium and there is limited available link capacity remaining on any given transmission medium. In such situations, it may be desirable for part of a communication stream to be communicated on a first transmission medium while another part of the communication stream is communicated on a second transmission medium. This process is referred to herein as stream splitting and stream aggregation (e.g., because the stream may be split on the transmit side, and aggregated on the receive side), and one set of embodiments of the disclosure relate to a system and method for selecting a stream for stream splitting/aggregation. As with path selection and load balancing, the process of selecting a stream for splitting/aggregation and determining in what manner to split the stream may be complicated by the fact that one or more of the transmission media may be dynamic in nature. It should be noted that in some embodiments, stream splitting/aggregation may also be used in the process of load balancing, e.g., as a more advanced technique.

The idea of using multiple transmission media to communicate between two electronic devices has many obvious advantages: in particular, a more robust network with greater overall capacity may thereby be created, with greater flexibility for accommodating different types of content with different Quality of Service (QoS) requirements or other needs. However, coordinating a move of a stream (partially, as in stream splitting/aggregation, or entirely) from one transmission medium to another transmission medium in a manner that will be recognized and successfully received by the receiving electronic device presents its own set of challenges. This may especially be the case if the transmission media are significantly different in nature and utilize different networking technologies. One example of this is packet ordering. If the transmission media have different transmission latencies, which may be common for different types of communication interfaces, the last few packets being communicated on a switched-from transmission medium may be received by an electronic device after the first few packets being communicated on a switched-to transmission medium. One set of embodiments of the disclosure relates to a system and method for enabling a receiver to detect such out-of-order packets and re-order them.

Additionally, while the ability to utilize multiple transmission media in a coordinated manner to communicate between two electronic devices provides the potential for moving a stream from a transmission medium which has failed to a transmission medium which is still functional, it would be desirable to provide a way to minimize potential packet loss caused by the failed transmission medium. One set of embodiments of the disclosure accordingly relates to a system and method for minimizing packet loss at a receiver when switching a stream to a new transmission medium, e.g., by maintaining a packet buffer which can be re-transmitted on a new transmission medium if it is determined that some or all of the packets in the packet buffer weren't successfully communicated to the receiver via the original transmission medium.

As a result of the aforementioned packet-loss minimization technique, or for other reasons, it may sometimes be the case that duplicate packets are communicated in switching a stream from one transmission medium to another transmission medium. For example, if a failing transmission medium transmits some of the packets which it is scheduled to transmit before failing, but the transmitting electronic device has no way of knowing this, it may re-transmit those packets using the new transmission medium. In this case the receiver may receive duplicate copies of at least some packets of a communication stream. It would be desirable for the receiver to be able to quickly determine this, preferably without needing to inspect the contents of the packets, in order to discard duplicate packets. Accordingly, one set of embodiments of the disclosure relate to a system and method for duplicate packet detection and removal.

The various embodiments of the disclosure may be implemented individually or in combination, as desired. For example, according to one set of embodiments, a first hybrid networking device which is coupled to a second hybrid networking device via a plurality of transmission media may be configured to implement path selection, load balancing, stream splitting/aggregation, out-of-order packet re-ordering, and packet loss minimization with duplicate packet detection and removal according to elements of the disclosure.

BRIEF DESCRIPTION OF THE DRAWINGS

A better understanding of the present invention can be obtained when the following Detailed Description of the Embodiments is read in conjunction with the following drawings, in which.

Figure 1:
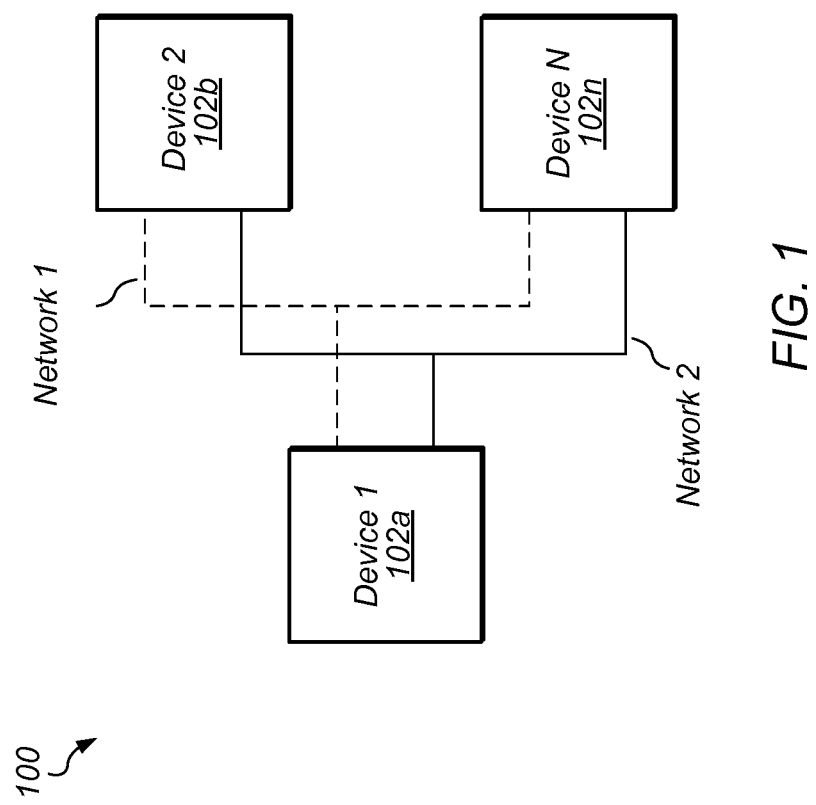
FIG. 1 illustrates an exemplary communication network including a plurality of networking technologies, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE DISCLOSURE

Terms

The following is a glossary of terms used in the present application:

Memory Medium—Any of various types of memory devices or storage devices. The terms "memory" and "memory medium" are intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as flash memory, hardware registers, a magnetic media (e.g., a hard drive), or optical storage. The memory medium may comprise other types of memory as well, or combinations thereof. The term "memory medium" may include two or more memory mediums.

Computer System—Any of various types of mobile or stationary computing or processing systems, including a personal computer system (PC), mainframe computer system, workstation, network appliance, Internet appliance, mobile phone, smart phone, laptop, notebook, netbook, or tablet computer system, personal digital assistant (PDA), multimedia device, or other device or combinations of devices. In general, the term "computer system" can be broadly defined to encompass any device (or combination of devices) having at least one processor that executes instructions from a memory medium.

Transmission Medium—Any of various media capable of being used for transmitting/receiving communication, including wired transmission media (such as twisted pair, optical fiber, telephone wiring, electrical wiring, etc) or wireless transmission media (such as any of a variety of licensed or unlicensed bands in the electromagnetic spectrum, etc.). The phrase "dynamic transmission medium" may more specifically refer to a transmission medium which is subject to substantial changes in its PHY rate over a short amount of time. 802.11 (WLAN/Wi-Fi) and powerline communication networks (PLC) are two examples of networking technologies which utilize dynamic transmission media:

relatively unpredictable factors such as interference, channel fading, noisy conditions, and others may affect both the ISM bands used by 802.11 networks and the electrical wiring used by PLC networks.

Stream—Also referred to as "Flow". As generally understood by those skilled in the art, the term stream may refer to a sequence of data elements made available over time which share some common characteristics. As one example, the data elements of a stream might have the same source and destination IP address and ports. In some embodiments the phrase may be used to refer to a sequence of data packets which are intended for use together, typically in an intended (e.g., sequential) order. For example, a stream might include a sequence of packets which may be used by an application to present a video (e.g., a video stream).

FIG. 1

FIG. 1 illustrates an exemplary hybrid network 100 including several devices 102a, 102b, ... 102n coupled via a plurality of networks (e.g., each of which may utilize a different transmission medium, or in some cases, multiple transmission media). The networking technologies may include Wi-Fi (e.g., using 2.4 GHz, 5 GHz, and/or another ISM band as its transmission medium), powerline communications (e.g., using electrical wiring as its transmission medium), Ethernet (e.g., using twisted pair, optical fiber, and/or other wired transmission media), and/or any of a variety of other networking technologies/transmission media. It should be noted that while FIG. 1 illustrates one possible hybrid network, other networking technologies may be used additionally or alternatively to the networking technologies shown, in any of a variety of arrangements, in accordance with embodiments of this disclosure.

FIG. 2

Figure 2:
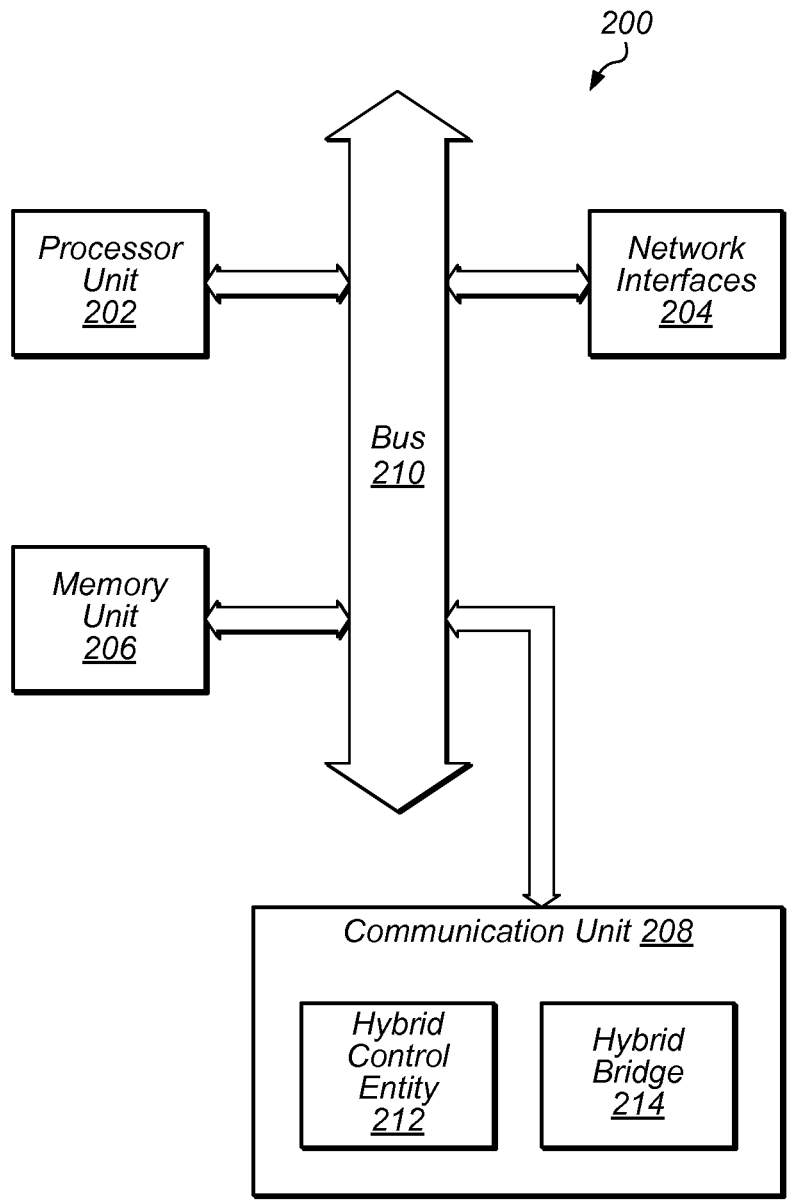
FIG. 2 is a system diagram of an exemplary device according to one embodiment.

FIG. 2 is a block diagram of one embodiment of an electronic device 200 configured to implement one or more embodiments of this disclosure. In some implementations, the electronic device 200 may be one of a desktop computer, laptop computer, a tablet computer, a mobile phone, a smart appliance, a powerline communication device, a gaming console, network bridging devices, or other electronic systems comprising a hybrid communication unit configured to communicate across multiple communication networks. The electronic device 200 includes a processor unit 202 (possibly including multiple processors, multiple cores, multiple nodes, and/or implementing multi-threading, etc.). The electronic device 200 includes a memory unit 206. The memory unit 206 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 200 also includes a bus 210 (e.g., PCI, ISA, PCI-Express, Hyper-Transport®, InfiniBand®, NuBus, AHB, AXI, etc.), and network interfaces 204 that may include one or more of a wireless network interface (e.g., a WLAN interface, a Bluetooth® interface, a WiMAX interface, a ZigBee® interface, a Wireless USB interface, etc.) and/or a wired network interface (e.g., a powerline communication interface, an Ethernet interface, etc.). In some implementations, the electronic device 200 can comprise a plurality of network interfaces—each of which couples the electronic device 200 to a different communication network. For example, the electronic device 200 can comprise a powerline communication interface, an Ethernet interface, and a WLAN interface that couple the electronic device 200 with a powerline communication network segment, Ethernet, and a wireless local area network respectively.

The electronic device 200 also includes a communication unit 208. The communication unit 208 may comprise a hybrid control entity 212 and a hybrid bridge 214. The hybrid control entity 212 and hybrid bridge 214 may be configured to perform any of a number of techniques relating to transmission and/or reception of streams using multiple, possibly dynamic transmission media. For example, the hybrid control entity 212 and/or hybrid bridge 214 may be configured to implement any or all of the methods of FIGS. 4-7 according to one set of embodiments. Any one of these functionalities may be partially (or entirely) implemented in hardware and/or on the processor unit 202 (e.g., executing program instructions stored on a memory medium such as memory unit 206). For example, the functionality may be implemented with an application specific integrated circuit, in logic implemented in the processor unit 202, in a co-processor on a peripheral device or card, etc. Further, realizations may include fewer or additional components not illustrated in FIG. 2 (e.g., video cards, audio cards, additional network interfaces, peripheral devices, etc.). The processor unit 202, the memory unit 206, and the network interfaces 204 are coupled to the bus 210. Although illustrated as being coupled to the bus 210, the memory unit 206 may be coupled to the processor unit 202.

FIG. 3

Figure 3:
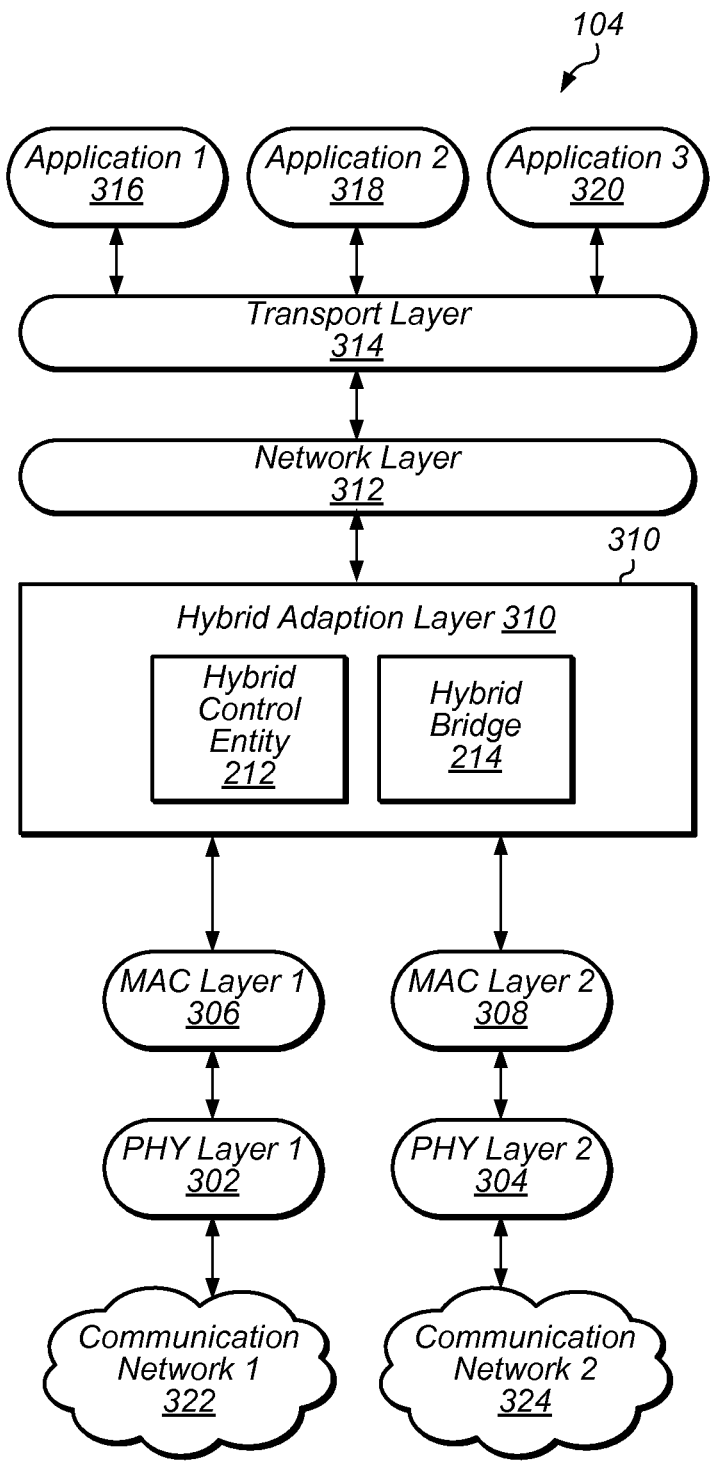
FIG. 3 is a conceptual diagram illustrating an exemplary protocol stack for a hybrid device that implements multiple networking interfaces according to one embodiment.

In one implementation, as depicted in FIG. 3, the networking functionality of the hybrid devices 102a ... 102n can be partitioned into sub-functions using a "layered" approach, consistent with the International Standards Organization (ISO) Open Systems Interconnection (OSI) reference model. The set of networking protocol layers may be referred to as a "protocol stack." FIG. 3 depicts an example protocol stack for a device 102 that implements multiple networking interfaces. In the example of FIG. 3, the hybrid device 102 includes two communication interfaces. Therefore, the hybrid device 102 comprises two physical (PHY) layers 302 and 304 and two corresponding Medium Access Control (MAC) layers 306 and 308. The MAC layer 306 and the PHY 302 layer couple the device 102 to one communication network segment 322 (e.g., Ethernet). Similarly, the MAC layer 308 and the PHY layer 304 couple the hybrid device 102 to another communication network segment 324 (e.g., powerline communication network). It is noted that the communication network segments 322 and 324 can each be a portion of an extended bridged network, such as a hybrid communication network. The device 102 comprises a network layer 312. The network layer 312 can implement an Internet Protocol version 4 (IPv4) communication protocol, an Internet Protocol version 6 (IPv6) communication protocol, an AppleTalk® communication protocol, or other suitable network layer protocol. The device 102 also implements a "hybrid adaptation layer" 310 between the network layer 312 and the MAC layers 306 and 308. In one example, as depicted in FIG. 3, the hybrid adaptation layer 310 can comprise the hybrid control entity 212, the hybrid bridge 214, and/or other modules configured to implement embodiments of this disclosure. The device 102 also comprises a transport layer 314 that operates across the network layer 312. The hybrid device 102 can implement transmission control protocol (TCP), user datagram protocol (UDP), and/or other suitable transport layer protocols depending on the network layer protocol implemented by the hybrid device 102. The hybrid device 102 also comprises three applications 316, 318, and 320 that may utilize the protocol stack for communication with other devices.

In some implementations, the application layer (comprising the applications 316, 318 and 320), the transport layer 314, and the network layer 312 can be collectively referred to as "upper protocol layers." The MAC layers 306 and 308 and the PHY layers 302 and 304 can be collectively referred to as "lower protocol layers." The hybrid adaptation layer 310 can implement functionality for managing network communications in the hybrid device 102 with a single set of upper protocol layers (e.g., a single network layer and transport layer for each upper layer protocol type implemented) but with multiple networking interfaces (e.g., multiple PHY layers and MAC layers). In one implementation, the hybrid adaptation layer 310 can interface with the underlying MAC layers 306 and 308 to manage networking resources and to make rapid packet route changes that are transparent to the upper layers of the protocol stack. The hybrid adaptation layer 310 can also enable the upper protocol layers to operate as if the source hybrid device 102 comprises only a single MAC layer and a corresponding single PHY layer. It is noted that the protocol stack depicted in FIG. 3 illustrates one embodiment of the architecture of a hybrid device 102. In other implementations, hybrid device(s) 102 can comprise other suitable layers or sub-layers, depending on the networking technology and optional protocols that might be implemented. For example, some networking technologies may implement an Ethernet convergence layer above the MAC layer. As another example, some networking technologies may include a logical link control (LLC) protocol layer. Furthermore, in some implementations, one or more other sub-layers may execute functionality described herein.

FIGS. 4-8

FIGS. 4-7 are flowchart diagrams illustrating several methods relating to network communication using multiple transmission media. While the steps described below with respect to FIGS. 4-7 are shown in a certain order, it should be noted that, according to various embodiments, one or more of the steps may be omitted, repeated, or performed in a different order than shown. One or more additional steps may also or alternatively be added, as desired. In some embodiments, one or more of the methods (or one or more steps of one or more of the methods) may be combined with each other.

Figure 4:
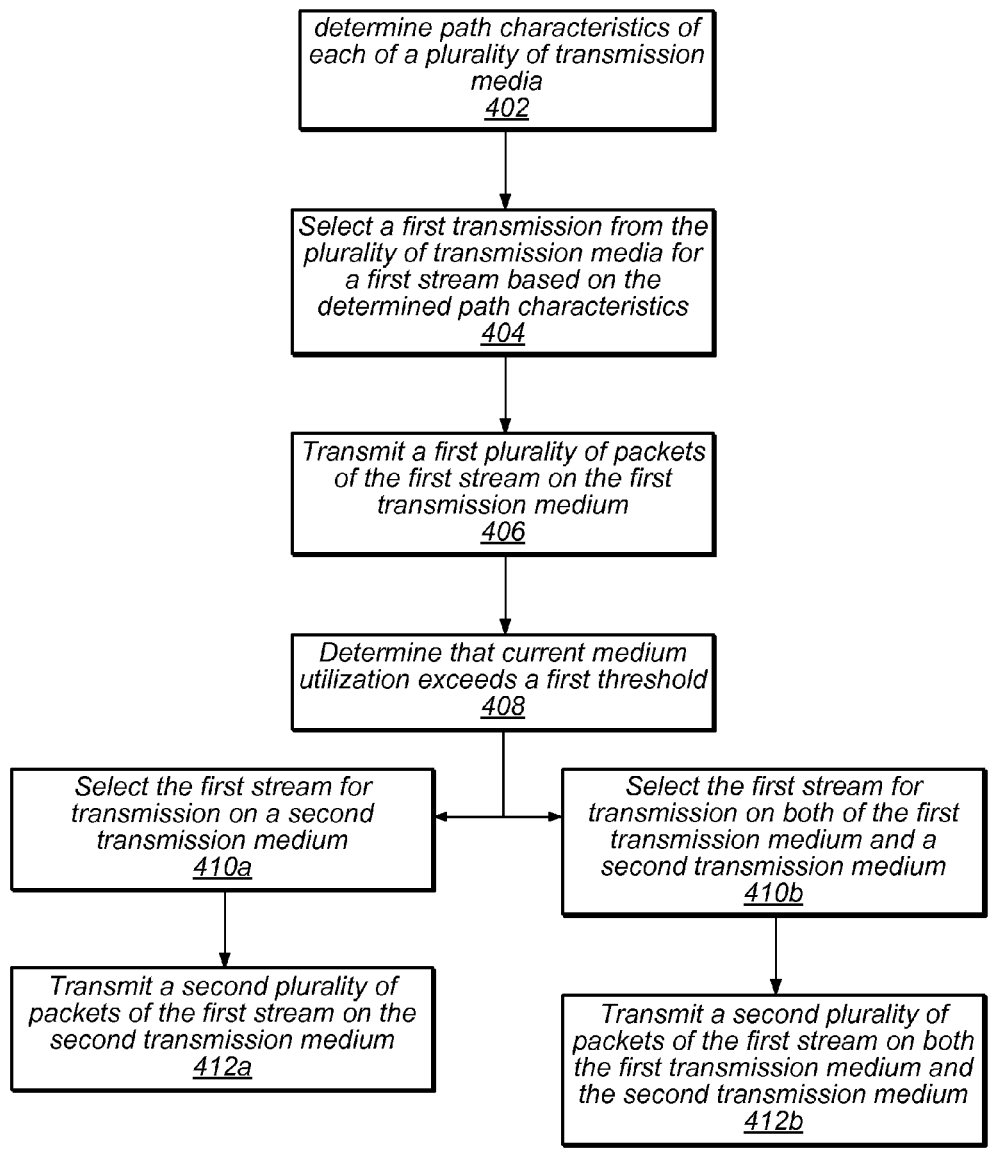
FIGS. 4-7 are flowchart diagrams illustrating methods for transmitting and receiving streams via multiple transmission media according to one set of embodiments.

FIG. 4 is a flowchart diagram illustrating embodiments of a method for a device to transmit a stream to a second device. The device implementing the method may be coupled to the second device via a plurality of transmission media; for example, the first and second devices may be two of the devices shown in FIG. 1, in some embodiments. The system implementing the method may be a system such as shown in FIG. 2 and described with respect thereto, in some embodiments. The system may implement an OSI protocol stack such as shown in FIG. 3 and described with respect thereto. For example, in one set of embodiments, the method may be implemented at the hybrid adaptation layer 310, e.g., by hybrid control entity 212 and/or hybrid bridge 214. In other embodiments, the method may be implemented at another layer or several layers (e.g., each of several layers may implement elements of the method). The method may be performed as follows.

In 402, path characteristics of each of a plurality of transmission media may be determined. In some embodiments, at least one of the transmission media may be substantially dynamic in nature. For example, the transmission media could include Wi-Fi (e.g., using 2.4 GHz, 5 GHz, and/or or another ISM frequency band), PLC (e.g., using electrical wiring), and/or one or more other substantially dynamic transmission media, which may vary in PHY rate over time depending on various factors (e.g., including interference, channel fading, or other factors). The transmission media may also include one or more transmission media which are not substantially dynamic in nature, i.e., transmission media for which the PHY rate may be substantially static and predictable over time, such as Ethernet.

According to some embodiments, the path characteristics determined for each transmission medium may include a current medium utilization, a maximum medium utilization, and/or one or more link capacities of each transmission medium. According to some embodiments, current medium utilization may be a percentage of time during which the transmission medium is busy. Maximum medium utilization may be a maximum permitted medium utilization. For example, if the current medium utilization is higher than the maximum medium utilization, the transmission medium may be considered oversubscribed or over-capacity, which may trigger one or more load-balancing decisions. In some embodiments, the maximum medium utilization may be set at less than 100%, i.e., a margin may be maintained in order to provide desired performance, e.g., accounting for variability in individual stream medium utilization. In other words, because the medium use rate of individual packet streams (the individual streams' "stream medium utilization") may vary over time, it may be desirable to set the maximum medium utilization rate at less than 100%, in order to avoid negatively impacting the performance of streams being communicated on the transmission medium by shifting traffic away from the medium before the amount of traffic that is scheduled to be transmitted on the medium exceeds the capacity of the medium to support that traffic. Maximum medium utilization of a transmission medium may be different for different types of transmission media/communication interfaces and/or depending on different types of streams (e.g., based on stream content, packet type, and/or priority level) which are scheduled to use the transmission medium according to various embodiments. The link capacity of a transmission medium for a particular destination may be the available data carrying capacity of the transmission medium between the source and destination device. In other words, a link capacity of a transmission medium is a measure of how much additional data the transmission medium is capable of transmitting to a particular device at a given time, e.g., in megabits per second (Mbps), gigabits per second (Gbps), or any other unit of measurement for data rates. In some embodiments, a link capacity may be estimated for each possible destination accessible by each transmission medium. For example, according to one set of embodiments, if a device were configured to communicate with two other devices using any of PLC, Wi-Fi 2.4 GHz, or Wi-Fi 5 GHz, six link capacity estimates might be determined. The link capacity may account for maximum medium utilization, the PHY rate of the transmission medium, and error rate, in some embodiments. Other factors may also or alternatively be included in link capacity calculation/estimation in some embodiments. For example, in one set of embodiments, link capacity of a transmission medium may be different for different types of streams, e.g., depending on priority and/or content type, because the link capacity calculation for higher priority streams may account for the possibility of displacing a lower priority stream.

It should be noted in some embodiments that these path characteristics may be determined for all of the transmission media (potentially including both dynamic and static transmission media) available to the system. In addition to (or instead of one or more of) these path characteristics, one or more other characteristics (possibly including medium specific characteristics) may be determined for one or more of the transmission media. For example, in some embodiments, effective medium utilization and link capacities may be determined for Wi-Fi connections. These derived path characteristics may be adjusted to account for the fact that such connections may include relaying through an access point (e.g., a wireless router). Additionally, use characteristics of individual streams (e.g., packet streams) on each transmission medium may be determined in some embodiments. For example, in some embodiments estimated stream medium utilization may be determined for each stream being transmitted on a transmission medium. As noted above, stream medium utilization may be a measure (e.g., a percentage of time) of how much a stream is using a transmission medium.

In 404, a first transmission medium may be selected from the plurality of transmission media for the first stream based on the determined path characteristics. The first stream may be a "new" stream, i.e., a stream for which no packets have yet been transmitted. The first stream may be intended for transmission to the second device which is coupled to the first device via the plurality of transmission media. In other words, the second device may be capable of receiving packets of the first stream from the first device via any of the plurality of transmission media. Thus, the first device may need to determine which transmission medium (path) to use to initially transmit packets of the first stream to the second device.

The actual path selection algorithm may use the determined path characteristics in any of a variety of ways, depending, e.g., on how many transmission media are available and how much link capacity each transmission medium currently has for the destination device of the first stream. The path selection algorithm may also depend on stream characteristics of the first stream (e.g., a content type (video, audio, other, etc), a packet type (e.g., UDP, TCP, etc), a priority level (e.g., low, medium, high). In some cases these stream characteristics may be automatically or manually correlated; for example, video content streams may automatically receive a high priority level in some embodiments. Other automatic or manual priority correlations are also possible.

In one set of embodiments, the first transmission medium may be selected based on having a greatest available link capacity among the plurality of transmission media. In some embodiments, the first transmission medium may be a preferred medium for the type of stream of the first stream among multiple transmission media that have sufficient link capacity (e.g., link capacity above a certain threshold) to support an additional stream of the type of the first stream.

In some embodiments, the path selection process may include determining a preferred order of transmission media for each of a plurality of types of streams. The preferred order of transmission media for each of the plurality of types of streams may apply primarily to new streams in some embodiments. For example, the preferred order may be used to assign a new stream to a transmission medium, but once a stream has been assigned to a transmission medium, packets of that stream may continue to be transmitted on that medium indefinitely (e.g., unless re-assigned because of an oversubscription or other event).

In one embodiment, the categorization of streams may be very simple; for example, UDP packets may be assigned a first preferred order of transmission media and non-UDP packets may be assigned a second preferred order of transmission media. In some embodiments, classification or categorization of streams based on type may not be performed at all: all types of streams may be treated equally in such embodiments. However, it may typically be desirable to provide greater capability for differentiation and classification of stream types, in order to provide a wider range of quality of service depending on stream characteristics, so in some embodiments streams may be classified into more than two classes.

Generally speaking, it may be preferable to assign high-priority (e.g., based on content type (e.g., voice, video, data, etc.), packet structure (TCP, UDP, etc.), manual assignment, or another basis) packet streams to transmission media which have a higher reliability and/or a greater link capacity (e.g., in order to provide best performance to high priority streams). However, other factors may also or alternatively have significant roles in determining preferred order of transmission media for a given type of stream.

It should be noted that in some embodiments, the assignment of preferred orders of transmission media for different stream types may be updated frequently based on changes to path characteristics. For example, if the medium utilization of a transmission medium increases significantly and/or the medium becomes oversubscribed, that transmission medium may fall to the bottom of the preferred order of transmission media for one or more types of stream, in order to avoid assigning additional streams to that transmission medium until its medium utilization has decreased and its link capacity has increased (e.g., because one or more streams finished or have been re-assigned to different transmission media).

In some embodiments, once the first transmission medium has been selected for transmission of the first stream, information may be stored indicating that subsequent packets of the first stream should be routed to the first transmission medium for transmission.

In 406, a first plurality of packets of the first stream may be transmitted on the first transmission medium. Depending on the embodiment, the first plurality of packets of the first stream may be transmitted individually and/or in bursts (i.e., in groups of multiple packets), potentially with individual packets or packet bursts of other streams transmitted on the first transmission medium in between individual packets or packet bursts of the first stream. The first plurality of packets of the first stream may be routed to the first transmission medium for transmission on the first transmission medium based on the selection of the first transmission medium for transmission of the first stream in step 406. In some embodiments, the routing may specifically be based on the stored information indicating that packets of the first stream should be routed to the first transmission medium for transmission. For example, in some embodiments, as new packets of the first stream are received for transmission by the first device, information in the new packets identifying the new packets as being part of the first stream may be used, in combination with the stored information indicating that packets of the first stream should be routed to the first transmission medium for transmission, to determine routing of the new packets.

In some embodiments, one or more other packet streams may be assigned to and transmitted on the first transmission medium and/or one or more other of the plurality of transmission media, e.g., before and/or after the assignment of the first stream to the first transmission medium. In some embodiments, path selection for such other streams may be performed in a similar manner; for example, one or more tables or other data structures may be maintained to track current preferred selection order of the plurality of transmission media for different types of streams and to track which transmission media are current assigned to which active packet streams. In some embodiments, when packet streams are no longer active, the stored information relating to them may be removed from the table(s) or other data structure(s).

It should also be noted that in some embodiments, one or more active packet streams assigned to each transmission medium may have different destination addresses. For example, as noted above, in some embodiments, each transmission medium may couple the device implementing the method to multiple other devices. Thus, it may be possible that one or more streams may be transmitted to different destination devices using the same transmission medium.

In 408, it may be determined that current medium utilization of the first transmission medium exceeds a first threshold. This may occur after the first plurality of packets (or at least a portion of the first plurality of packets) has been transmitted on the first transmission medium, in some embodiments, e.g., as a result of changed medium conditions and/or additional streams having been assigned to the first transmission medium. For example, it may be determined that current medium utilization exceeds maximum medium utilization of the first transmission medium. As noted above, this may be referred to herein as an over-subscription event, and may indicate that the first medium is over-subscribed. In order to maintain desired performance and quality of service of streams on the first transmission medium, it may be desirable to (partially or entirely) shift one or more streams which are currently being transmitted on the first transmission medium to another transmission medium. Generally speaking it may be preferable to shift streams between transmission media in their entirety, e.g., to avoid overhead associated with transmitting streams using multiple communication interfaces. However, in some circumstances (e.g., in which no available transmission medium has sufficient link capacity to support transmission of any stream currently being transmitted on the first transmission medium in its entirety), it may be desirable to split transmission of a stream between two or more communication interfaces.

In 410a, the first stream may be selected for transmission on a second transmission medium. The first stream may be selected for transmission on the second transmission medium based on determining that current medium utilization of the first transmission medium exceeds the first threshold. The process for selecting the first stream for transmission on the second transmission medium (e.g., instead of the first transmission medium) may contain similarities to the process for initial path selection, in some embodiments. For example, characteristics of the first stream and any other streams being transmitted on the first transmission medium (i.e., which is oversubscribed) may be taken into consideration in selecting the first stream to be moved to the second transmission medium. Similarly, characteristics of the second transmission medium and any other of the plurality of transmission media may be taken into consideration in selecting the second transmission medium for transmission of the first stream.

In some embodiments, the process of selecting a stream which is currently being transmitted on the first transmission medium to re-assign to a different transmission medium may include determining the stream medium utilization of each stream being transmitted on the first medium. According to one set of embodiment, the stream with the largest stream medium utilization may preferably be selected for re-assignment to another transmission medium. In another set of embodiments, the stream with the smallest stream medium utilization may preferably be selected for re-assignment to another transmission medium. In some embodiments, stream priority may also be considered; for example, in some embodiments, a stream with a lowest priority level may preferably be selected for re-assignment, or a stream with largest (or smallest) stream medium utilization among streams with a lowest priority level may be preferably selected for re-assignment.

In other embodiments, other factors, in addition to or instead of stream priority and stream medium utilization, may be considered in determining which stream to re-assign to a new transmission medium. For example, characteristics of the transmission media themselves may affect which stream is selected for re-assignment. In some embodiments, characteristics of the available transmission media may also or alternatively be taken into consideration in selecting the new transmission medium to which a stream will be re-assigned. For example, the current link capacity of each of the plurality of transmission media may be determined and considered, both in selecting a stream (e.g., the first stream) for transmission on the new transmission medium (e.g., the second transmission medium) and in selecting a new transmission medium (e.g., the second transmission medium) on which to transmit the stream selected for re-assignment (e.g., the first stream). As noted above, in some embodiments, it may be preferable to select a stream with lowest priority and/or greatest stream medium utilization for re-assignment. However, if there is no transmission medium available with sufficient link capacity to add the stream with lowest priority and/or greatest stream medium utilization, a stream with higher priority and/or lower stream medium utilization may be selected for re-assignment.

In one exemplary set of embodiments, the re-assignment process may be performed as follows. The transmission medium with the greatest available link capacity may be selected to have a stream re-assigned from the first transmission medium to it. It may be determined whether the selected transmission medium has sufficient link capacity for the stream preferably selected (e.g., as a result of stream priority, stream medium utilization, or other factors) for re-assignment. If the selected transmission medium does have sufficient link capacity for that stream, that stream may be re-assigned to the selected transmission medium. If the selected transmission medium does not have sufficient link capacity for that stream, it may be determined whether the selected transmission medium has sufficient link capacity for a next-in-line stream. The process may be continued in such a manner until an acceptable stream is selected for re-assignment to the selected transmission medium. If no acceptable stream is selected (e.g., if there are no available transmission media with sufficient link capacity to support any of the streams currently being transmitted on the first transmission medium, or for another reason) for re-assignment in its entirety, the method may alternately proceed to step 410b, in order to determine whether a stream may be partially re-assigned, e.g., split/aggregated.

In some embodiments, an indication may be provided to the second device that the first stream has been reassigned to the second transmission medium. The indication may include a control message, such as one or more control packets, or may take another form. Alternatively, in some embodiments, no indication may be provided, and the second device may be configured to determine that the first stream has been re-assigned to the second transmission medium simply based on receiving packets of the first stream on the second transmission medium.

In 412*a*, a second plurality of packets of the first stream may be transmitted on the second transmission medium. The second plurality of packets of the first stream may be transmitted on the second transmission medium based on selecting the first stream for transmission on the second transmission medium (e.g., in 410*a*). After it is determined that the first stream should be transmitted on the second transmission medium (e.g., as a result of oversubscription of the first transmission medium and a selection algorithm based on one or more path characteristics of the second transmission medium and/or one or more stream characteristics of the first stream), information may be stored indicating that subsequent packets of the first stream should be routed to the second transmission medium. For example, if there is a table or other data structure storing information indicating to which transmission medium each active stream is assigned, the table may be updated to indicate that the packets of the first stream should be routed to the second transmission medium.

After the first stream has been re-assigned to the second transmission medium, packets of the first stream may no longer be transmitted on the first transmission medium, e.g., based on the updated table or other data structure indicating that packets of the first stream should be routed to the second transmission medium. Depending on the level of oversubscription of the first transmission medium, the first transmission medium may no longer be oversubscribed after re-assignment of the first stream. In this case no further re-assignment of streams may be necessary, at least until another over-subscription event occurs (or a transmission medium fails, in which case all streams being transmitted on the transmission medium may be re-assigned to new transmission media). However, if the first transmission medium is still oversubscribed after re-assignment of the first stream, another oversubscription event may occur, which in some embodiments may trigger the re-assignment of another stream away from the first transmission medium. It should be noted that in some embodiments, there may be a delay (e.g., a configurable delay) between shifting a stream away from a transmission medium due to an oversubscription event and re-measuring medium utilization of the transmission medium. This may be desirable in order to be sure that updated data/statistics are used and the transmission medium is not incorrectly determined to still be oversubscribed based on older data/statistics.

As noted above, according to some embodiments, if no stream being transmitted on the first transmission medium may be re-assigned in its entirety to another transmission medium without causing oversubscription of another transmission medium, a stream may be selected for transmission on multiple transmission media. Thus, in such a case, as an alternative to step 410*a*, in 410*b*, the first stream may be selected for transmission on both of the first transmission medium and a second transmission medium. Thus, in some embodiments, the first stream may be selected for transmission on both of the first transmission medium and the second transmission medium based on determining that current medium utilization of the first transmission medium exceeds the first threshold, and also based on determining that there is no alternate transmission medium among the plurality of transmission media which has sufficient available link capacity (e.g., to any destination device accessible by the transmission medium) for any stream currently being transmitted on the first transmission medium to be transmitted entirely on the alternate transmission medium.

In addition, in some embodiments it may be determined that the second device is configured to aggregate streams. This determination may be made based on initial configuration messages transmitted between the first and second devices, in some embodiments. Alternately, the first device may query the second device, and receive a positive response indicating that the second device is configured to aggregate streams, or may simply attempt to split the first stream without confirmation of the second device's ability to aggregate streams. In general, however, it may be preferable to receive confirmation of the second device's ability to aggregate streams before splitting the first stream between multiple transmission media. In some embodiments, if the first device receives an indication that the second device is not configured to aggregate streams, the first device may not split the first stream. In this case a best effort attempt at load balancing without stream splitting/aggregation may be made. Alternatively, a stream being transmitted to a different device using the first transmission medium may be selected for splitting, e.g., if the other device supports stream aggregation.

Selection of the two transmission media to which to re-assign a stream may be more complicated than selecting a stream for re-assignment to a single new transmission medium in some embodiments. As noted above, splitting a stream at a transmitting device and aggregating the split stream at a receiving device may incur significant additional overhead and may be a less efficient use of the individual transmission media than transmitting all streams entirely on one transmission medium or another. However, in situations where it is difficult or impossible to load-balance the plurality of transmission media in a manner that accommodates all active streams without causing oversubscription of at least one transmission medium, it may be preferable to other options, as it may present an opportunity to more efficiently use the plurality of transmission media as a whole.

In some embodiments, the selection process to determine the two transmission media to which to re-assign a stream, and selection of the stream to re-assign, may include use of many of the same characteristics as are used in selection of a transmission medium and stream for re-assignment without splitting. For example, the link capacity of the various transmission media and the stream medium utilization and/or the type (e.g., priority) of the individual streams being transmitted on the first transmission medium may be determined and used in selecting the first stream for re-assignment to both the first and second transmission media. In one exemplary set of embodiments, two transmission media with highest link capacity may be selected to have a stream re-assigned to them. In another set of embodiments, the first transmission medium may automatically be selected to continue transmitting a portion of the stream selected for re-assignment, and a transmission medium with the highest link capacity of the remaining transmission media may be selected as the second transmission medium. Other processes for selecting the two transmission media to which to re-assign a stream may alternatively be used, if desired.

It should be noted that in some embodiments, it may not be desirable to split a single stream between three or more transmission media, as the increased overhead caused by this additional splitting and aggregation may not be desirable or necessary. For example, if successful load balancing cannot be achieved by splitting one stream between two transmission media, it may be desirable to split a second stream between two (e.g., other) transmission media rather than split a single stream between three or more transmission media. However, splitting a stream between three or more transmission media may be performed, if desired.

As noted above, in some embodiments, selection of the stream for splitting and re-assignment to multiple transmission media may be based on characteristics of the stream and/or characteristics of the transmission media. For example, in one set of embodiments, having selected the two transmission media with the highest link capacities to which to re-assign a stream, the stream to be re-assigned may be selected based on its stream medium utilization and/or its priority. Thus, in one set of embodiments, the stream (e.g., the first stream) may be selected from among streams which have a lowest priority level, and may be a stream with a highest stream medium utilization that can be accommodated by the selected transmission media among the streams with the lowest priority level. Alternatively, e.g., if no acceptable stream with a lower priority can be found, the stream may be selected from among streams with a higher priority level, and may be a stream with a highest stream medium utilization that can be accommodated by the selected transmission media among streams which have the higher priority level. Other sets of embodiments may utilize different selection criteria and/or may use the same selection criteria in a different way, as desired; for example, in another set of embodiments, a stream with a smallest stream medium utilization may preferably be selected, streams with higher priority may be exempted from splitting (or re-assignment of any form), and/or a stream of lowest priority may be selected regardless of whether it can be accommodated by the selected transmission media, e.g., as a best effort attempt at load balancing.

In some embodiments, once a stream has been selected for re-assignment, further calculations may be performed in order to determine how best to split the stream (e.g., first stream) between the selected transmission media (e.g., the first and second transmission media). For example, it may be desirable to determine a proportion of packets of the first stream to be routed to the first transmission medium and a proportion of packets of the first stream to be routed to the second transmission medium in a manner that avoids oversubscription of either transmission medium. In one set of embodiments, this calculation may include determining an amount by which the current medium utilization exceeds the maximum medium utilization of the first transmission medium, and selecting a ratio to use in splitting the first stream which re-assigns at least the amount by which the current medium utilization exceeds the maximum medium utilization of the first transmission medium to the second transmission medium.

In 412b, a second plurality of packets of the first stream may be transmitted using both the first transmission medium and the second transmission medium. Transmitting the first stream using both the first transmission medium and the second transmission medium may include transmitting a first portion of the second plurality of packets on the first transmission medium and transmitting a second portion of the second plurality of packets on the second transmission medium. In some embodiments, a ratio (e.g., an approximate or exact ratio) configured to avoid subsequent oversubscription of the first or second transmission medium may be maintained between the first portion and the second portion of the second plurality of packets.

As in other stream re-assignment situations, in some embodiments information indicating that packets of the stream selected for splitting/aggregation are to be routed to the selected transmission media may be stored based on selecting that stream and those transmission media. In addition, in some embodiments, information indicating a ratio to use in splitting the selected stream may be stored. The information may be stored in a table or other data structure; for example, in some embodiments, the information previously stored indicating the previous transmission medium assignment of the selected stream may be updated to indicate the selected stream's new transmission media assignment and ratio.

In some embodiments, an indication may also be provided to the second device that the second plurality of packets is being transmitted using both of the first and second transmission media. In one set of embodiments, a control message including aggregation instructions (e.g., including a recommended size for an aggregation buffer) may be transmitted by the first device to the second device, indicating that the second plurality of packets is being transmitted using both of the first and second transmission media. This may allow the second device to initiate an aggregation buffer and/or perform other techniques for aggregating the first stream. In some embodiments, one or more techniques intended to aid the second device in aggregating the first stream may also be performed.

In one embodiment, sequence numbers may be inserted into packets of the first stream, e.g., if the first stream doesn't already include sequence numbers. Sequence numbers may assist the second device in re-ordering a split stream. While TCP and RTP packet streams may inherently include packet sequence numbers, UDP packet streams may not inherently include sequence numbers accessible by the second device and usable in re-ordering a split stream. Thus, in some embodiments, sequence numbers may be inserted into packets of the first stream, e.g., by packet encapsulation (e.g., conversion to TCP), insertion of sequence numbers into a redundant field (such as a VLAN tag, in some embodiments), or by another means.

Alternatively, or in addition, switch marker packets may be inserted at the beginning of bursts on each transmission medium, in some embodiments. Switch marker packets may indicate the beginning of a portion of a stream being communicated on a transmission medium (a "burst"). Thus, a "beginning-of-stream" marker packet communicated on one transmission medium may indicate that a next portion of the stream (according to intended packet ordering) is being communicated on that transmission medium. In some embodiments, each beginning-of-stream marker packet may include information indicating a size of the burst about to be transmitted on that transmission medium. This may allow the receiver to determine when the burst is finished, and thus possibly when a next burst should be expected on a different transmission medium.

As noted above, in some embodiments, stream splitting/aggregation may be executed in a manner that maintains a ratio of the proportions of the stream which are transmitted on each transmission medium. One means of accomplishing this may be to use different burst sizes on each transmission medium, where the burst sizes are configured according to the ratio. For example, if a ratio of 21:33 is desired, packet bursts of 21 (or a multiple of 21, such as 42) packets may be transmitted on a first transmission medium while packet bursts of 33 (or a multiple of 33, such as 66) may be transmitted on a second transmission medium.

In some embodiments, "end-of-stream" marker packets may also be used. For example, in some embodiments, beginning-of-stream marker packets may not include information indicating the size of the burst transmitted on that transmission medium, but an end-of-stream marker packet may be transmitted at the end of the burst to indicate to the receiver that the burst is finished, (e.g., and that no further packets of that stream are being communicated on that transmission medium at the current time). However, in some embodiments, using end-of-stream marker packets may not be as desirable, as it may represent an unnecessary addition of overhead relative to simply including burst size information in beginning-of-stream marker packets.

Thus, in one set of embodiments, a beginning-of-stream marker packet may be inserted at the beginning of the first portion of the second plurality of packets (and, in some embodiments, an end-of-stream marker packet may be inserted at the end of the first portion of the second plurality of packets). Similarly, a beginning-of-stream marker packet may be inserted at the beginning of the second portion of the second plurality of packets (and, in some embodiments, an end-of-stream marker packet may be inserted at the end of the second portion of the second plurality of packets). The switch marker packets may indicate to the second device how to recombine the second plurality of packets according to an intended stream packet order, such that after reception, the first and second portions of the second plurality of packets (and any subsequent stream portions, which may similarly include beginning-of-stream and possibly end-of-stream marker packets as long as the stream is being split) may be re-combined in their intended order regardless of whether they are received in order.

As noted above, stream splitting and aggregation may incur additional overhead relative to transmitting a stream entirely on a single transmission medium. Thus, in some embodiments, it may be desirable to monitor the link capacity of various transmission media and stream medium utilization of various streams in order to re-merge split streams when sufficient link capacity becomes available to transmit a split stream entirely on a single transmission medium. For example, in one set of embodiments, it may be determined, at a subsequent time, that a transmission medium (e.g., the first transmission medium, or another transmission medium) has sufficient available link capacity for the first stream to be transmitted entirely on that transmission medium. In such a case, the first stream may be re-assigned entirely to that transmission medium, and a third plurality of packets of the first stream may be transmitted on that transmission medium, all of which may be transmitted on the newly selected transmission medium.

Figure 5:
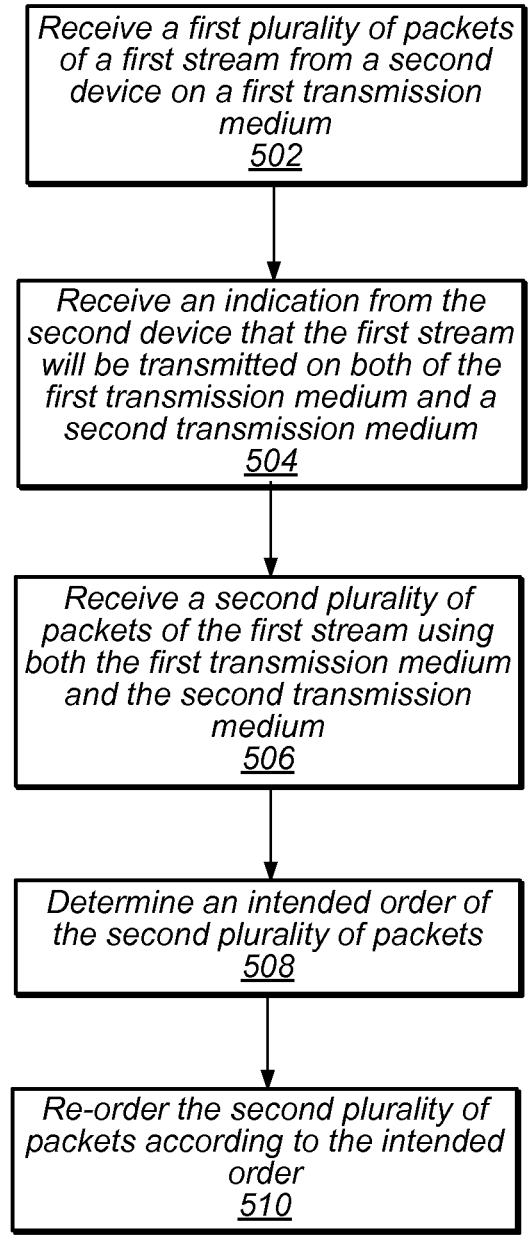

FIG. 5 is a flowchart diagram illustrating a method for a device to receive a first stream from a second device on a plurality of transmission media. According to some embodiments, the steps of method of FIG. 5 may correspond to at least some receiver-side actions in response to transmitter-side actions such as shown in and described with respect to FIG. 4. In particular, FIG. 5 may relate to the process of being alerted to initiation of and/or termination of splitting of a stream between two transmission media, and possible actions taken by the receiver in order to insure successful aggregation and correct packet ordering of a split stream.

The device implementing the method may be coupled to the second device via a plurality of transmission media; for example, the first and second devices may be two of the devices shown in FIG. 1, in some embodiments. The system implementing the method may be a system such as shown in FIG. 2 and described with respect thereto, in some embodiments. The system may implement an OSI protocol stack such as shown in FIG. 3 and described with respect thereto. For example, in one set of embodiments, the method may be implemented at the hybrid adaptation layer 310, e.g., by hybrid control entity 212 and/or hybrid bridge 214. In other embodiments, the method may be implemented at another layer or several layers (e.g., each of several layers may implement elements of the method). The method may be performed as follows.

In 502, a first plurality of packets of the first stream may be received from the second device on a first transmission medium. All of the first plurality of packets may be received on the first transmission medium. In other words, the first stream may initially be received entirely on a single transmission medium.

In 504, an indication may be received from the second device that the first stream will be transmitted on both of the first transmission medium and a second transmission medium. The device may store information indicating that the first stream will be transmitted on both of the first transmission medium and the second transmission medium. In some embodiments, receiving this indication may also trigger initiation of an aggregation buffer in order to insure that packet ordering of packets received on the first and second transmission media isn't compromised.

In 506, a second plurality of packets of the first stream may be received from the second device using both the first transmission medium and the second transmission medium. A first portion (e.g., a first burst) of the second plurality of packets may be received on the first transmission medium while a second portion (e.g., a second burst) of the second plurality of packets may be received on the second transmission medium.

In some embodiments, packets of the first stream may be received in an alternating manner (e.g., alternating bursts) on the first and second medium. Because of this, it is possible and even likely that on occasion packets will not be received in their intended packet ordering. In other words, in some embodiments, at least a portion of the second plurality of packets of the first stream may be received in a different order than intended. In such cases, one or more further steps may be performed, e.g., in order to re-order the received packets.

In 508 and 510, an intended order of the second plurality of packets may be determined, and the second plurality of packets may be re-ordered according to the intended order of the second plurality of packets. In many embodiments the portions packets may be correctly ordered internally. Thus, in some embodiments, a mechanism for re-ordering (re-combining) the portions of the first stream received via the different transmission media may be provided. As noted above, in one set of embodiments this may include an aggregation buffer. The nature and size of the aggregation buffer may vary according to different embodiments. In some embodiments, the indication received from the second device may include a recommended aggregation buffer size, e.g., based on characteristics of the first stream and/or the first and second transmission media.

Some aggregation buffering techniques may utilize packet sequence numbers. Accordingly, in some embodiments, packets of the first stream may include sequence numbers. Some types of streams (e.g., TCP, RTP) may inherently include sequence numbers which can be used for packet re-ordering. Some other types of streams (e.g., UDP) may not inherently include sequence numbers. In such cases sequence numbers may be inserted into stream packets, e.g., by encapsulating stream packets, or inserting sequence numbers in a redundant field (e.g., a VLAN tag, in some embodiments), or by another means.

In one set of embodiments, the aggregation buffer may be a circular buffer. Initiating and maintaining the circular buffer may include determining and maintaining a base sequence variable, which may be a pointer to a packet (e.g., based on that packet's packet sequence number) which is next-in-line for processing. Newly received packets may be stored in the buffer at appropriate locations in the buffer relative to the base sequence pointer, based on their sequence numbers, and packets may be processed and the base sequence variable updated as appropriate.

Using packet sequence numbers and a circular buffer as just described may be one possible technique for ensuring that the first stream can be aggregated into its intended packet ordering regardless of whether some packets of the first stream are received out-of-order. However, as noted above, not all types of streams inherently include sequence numbers, and in such cases artificially inserting sequence numbers can be burdensome and may potentially create additional problems. For example, encapsulating a packet to add sequence numbers may enlarge packet beyond a size supported by switches, in some embodiments, while inserting a tag in a redundant field may require additional complexity and potentially create ambiguity by using a field for a non-intended purpose.

As one possible alternative (e.g., for flows which do not inherently include sequence numbers, or for all flows in general), in some embodiments, switch marker packets may be inserted in the first stream just before (and, in some embodiments, after) transmission of packets of the first stream is moved from one transmission medium to another. Switch marker packets may indicate the beginning or the end of a portion of a stream being communicated on a transmission medium. Thus, a "beginning-of-stream" marker packet communicated on one transmission medium may indicate that a next portion of the stream (according to intended packet ordering) is being communicated on that transmission medium. Similarly, an "end-of-stream" marker packet may indicate that no further packets of that stream are being communicated on that transmission medium at the current time.

Thus, in one set of embodiments, a beginning-of-stream marker packet may be received at the beginning of the first portion of the second plurality of packets and an end-of-stream marker packet may be received at the end of the first portion of the second plurality of packets. Similarly, a beginning-of-stream marker packet may be received at the beginning of the second portion of the second plurality of packets and an end-of-stream marker packet may be received at the end of the second portion of the second plurality of packets. The switch marker packets may indicate to the device how to recombine the second plurality of packets according to an intended stream packet order, such that after reception, the first and second portions of the second plurality of packets (and any subsequent stream portions, which may similarly include beginning-of-stream and end-of-stream marker packets as long as the stream is being split) may be re-combined in their intended order regardless of whether they are received in order.

For example, in some embodiments, a beginning-of-stream marker packet and some packets of the second portion of the second plurality of packets may be received on the second transmission medium before some packets of the first portion of the second plurality of packets and an end-of-stream marker packet are received on the first transmission medium, although the second portion of the second plurality of packets may be after the first portion of the second plurality of packets in the intended ordering of the first stream. In this case, any prematurely received packets of the second portion of the second plurality of packets may be buffered in the aggregation buffer until all of the packets of the first portion of the second plurality of packets are received and processed. In some embodiments, the fact that the entire first portion of the second plurality of packets has been received may be indicated by reception of the end-of-stream marker packet on the first transmission medium. At that point, the buffered packets may be forwarded to the next layer of the protocol stack for processing, such that the second plurality of packets may be processed in the order intended.

Of course, it is also possible that in some cases the end-of-stream marker packet may not be received, e.g., due to an error of some sort. In this case, there may be a time-out parameter, e.g., based on actual time or on buffer size (fullness), in order to avoid waiting indefinitely for further packets which are not coming to be received on the first transmission medium.

In another set of embodiments, beginning-of-stream marker packets may be used without also using end-of-stream marker packets. For example, as noted above with respect to FIG. 4, in some embodiments, a beginning-of-stream marker packet received on a particular transmission medium may include information indicating a burst size of the burst about to be transmitted on that transmission medium. In this case, the receiver may be able to determine when the end of the burst occurs based on the burst size information in the beginning-of-stream marker packet (e.g., when the number of packets indicated by the burst size information in the beginning-of-stream marker packet has been received).

Thus, in some embodiments, a first beginning-of-stream marker packet of the first stream may be received on the first transmission medium. The first beginning-of-stream marker packet may include information indicating a first burst size. A first burst of packets (e.g., having the first burst size) of the first stream may then be received on the first transmission medium.

A second beginning-of-stream marker packet of the first stream may also be received, on a second transmission medium. The second beginning-of-stream marker packet may include information indicating a second burst size. A second burst of packets (e.g., having the second burst size) of the first stream may then be received on the second transmission medium.

In some embodiments, a first portion of the second burst may be received on the second transmission medium after a first portion of the first burst is received on the first transmission medium and before a second portion of the first burst is received on the first transmission medium. In this case, it may be determined, based on the information indicating the first burst size in the first beginning-of-stream marker packet, that the second portion of the first burst has yet to be received when the first portion of the second burst is received. Based on this, the first portion of the second burst may be stored in a buffer while the first and second portions of the first burst are processed, and the first portion of the second burst may be processed after processing the second portion of the first burst has been completed (e.g., because all packets of the first burst may be before any packets of the second burst in intended stream ordering).

It will be noted that in some embodiments, such as when switch marker packets are used as described above, there may be no need to implement the aggregation buffer as a circular buffer, though the aggregation buffer may still be implemented as a circular buffer if desired.

It should be noted that while switch marker packets are described above primarily as being used in the case of stream splitting/aggregation, switch marker packets may also or alternatively be used in stream re-assignment situations in which streams are being transferred in their entirety to a new transmission medium.

Figure 6:
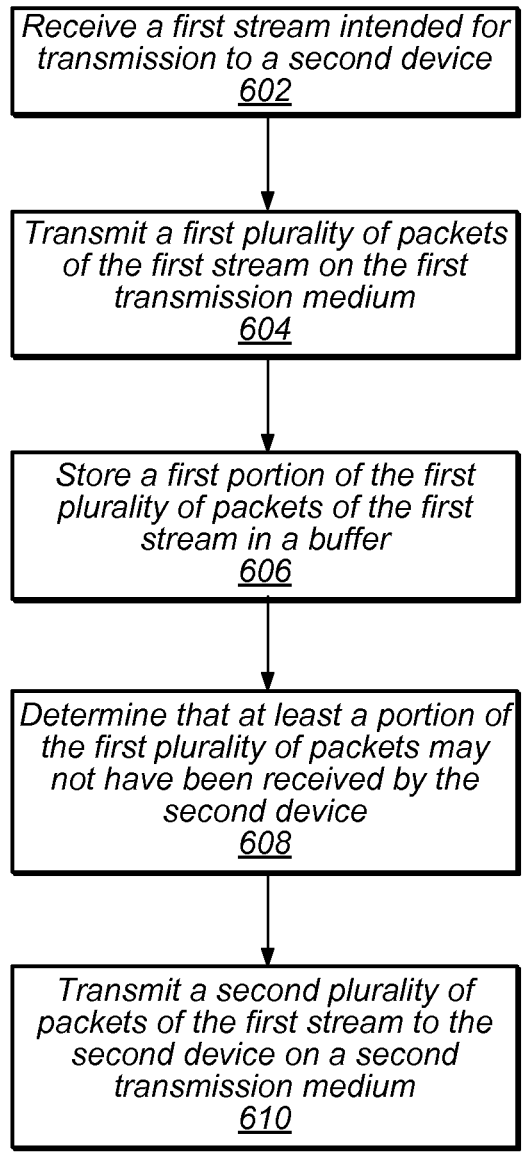

FIG. 6 is a flowchart diagram illustrating a method for a device to switch a stream to a new transmission medium. The method of FIG. 6 may be used primarily in "fail-over" situations, i.e., situations in which a transmission medium has failed (i.e., has undergone a significant or total loss in communication capability). However, part or all of the method of FIG. 6 may also or alternatively be used in normal load-balancing situations, i.e., in which both the original transmission medium and the new transmission medium are capable of being used for communication.

The device implementing the method may be coupled to a second device via a plurality of transmission media; for example, the first and second devices may be two of the devices shown in FIG. 1, in some embodiments. The system implementing the method may be a system such as shown in FIG. 2 and described with respect thereto, in some embodiments. The system may implement an OSI protocol stack such as shown in FIG. 3 and described with respect thereto. For example, in one set of embodiments, the method may be implemented at the hybrid adaptation layer 310, e.g., by hybrid control entity 212 and/or hybrid bridge 214. In other embodiments, the method may be implemented at another layer or several layers (e.g., each of several layers may implement elements of the method). The method may be performed as follows.

In 602, a first stream intended for transmission to a second device may be received. The first stream (e.g., packets of the first stream) may be received from a higher protocol layer.

In 604, a first plurality of packets of the first stream may be transmitted to the second device on a first transmission medium. The first plurality of packets may include one or more index marker packets. Each index marker packet may include an index number. For example, in some embodiments, an initial index marker packet may have an index number of 1 (or any other number, as desired), and each subsequent index marker packet may have an index number which is incremented by one relative to the index number in the index marker packet previous to it. The index marker packets may be inserted into the first stream. The index marker packets may be inserted into the first stream at regular or irregular intervals. In one set of embodiments, an index marker packet may be inserted into the first stream every n packets, where n may be 50, 100, 1000, 5000, or any other number, as desired. In some embodiments, the value of n may not be fixed, and may be varied on some intervals or even every interval.

In 606, a first portion of the first plurality of packets of the first stream may be stored in a buffer. In some embodiments, at least a portion of the packets of the first stream may be (e.g., temporarily) stored in a transmit buffer. The index marker packets may be stored in the transmit buffer as well, in some embodiments.

In 608, it may be determined that at least a portion of the first plurality of packets may not have been received by the second device. In some embodiments, a transmission medium (or an interface that utilizes a particular transmission medium) may occasionally temporarily or permanently fail. Failure of a transmission medium, as used herein, is intended to refer to a situation in which streams may no longer be transmitted on the transmission medium due to a (temporary or permanent) significant or complete loss of communication capability. Thus, if it is determined that the first transmission medium has failed, it may be deduced that at least a portion of the first plurality of packets may not have been received by the second device.

If the first transmission medium fails, each stream that is assigned to the first transmission medium may be re-assigned to a new transmission medium. The selection process may be similar to the load-balancing new transmission medium selection process described above with respect to FIG. 4, in some embodiments. For example, characteristics of the first stream (and possibly other streams) and one or more of the available transmission media may be considered in order to determine which transmission medium (or media) can best accommodate the first stream (and possibly other streams). In some embodiments, it may be determined that the first stream should be re-assigned to the second transmission medium.

Because some of the first plurality of packets may not have been received by the second device, it may be determined that at least a portion of the packets stored in the transmit buffer should be re-transmitted. In addition, in some embodiments, buffer marker packets may be transmitted to the second device on the second transmission medium at the beginning and at the end of the re-transmitted packets, to indicate to the receiver that the "highlighted" packets (i.e., the packets between the buffer-begin marker packet and the buffer-end marker packet) may duplicate previously transmitted packets (e.g., packets transmitted on the first transmission medium as part of the first plurality of packets).

In some embodiments, the buffer-begin marker packet may include information identifying an index marker packet and indicating a position of the buffer-begin marker packet in the first stream relative the identified index marker packet. For example, in some embodiments, a buffer-begin marker packet for a stream may include the index number of the last index marker packet of the stream prior to the first packet in the buffer, and the number of packets in the stream between that index marker packet and the first packet in the buffer. This may allow the second device to identify and discard any duplicate packets regardless of whether the index markers are inserted at regular (e.g., predictable) intervals or not, as the second device may only need to track one or more recently received index marker packet index numbers and the number of packets received since those one or more recently received index marker packets.

In some embodiments, the buffer-begin marker packet may also include information indicating a size of the buffer. For example, rather than transmitting a buffer-end packet, it may be advantageous to simply indicate to the receiver a size (e.g., a number of packets) of the buffer, which may enable the receiver to determine when the entirety of the buffer has been received. This may be desirable in order to avoid the additional overhead embodied in the buffer-end packet.

It should be noted that in some embodiments, buffer marker packets may not be used, as in some embodiments, index marker packets may provide sufficient basis (e.g., if inserted at regular intervals) for the second device to determine whether duplicate packets have been received and to identify and discard such duplicate packets.

In 610, a second plurality of packets of the first stream may be transmitted to the second device on the second transmission medium. The second plurality of packets may include at least a subset of the first plurality of packets, and may also include at least a subset of the one or more index marker packets. The second plurality of packets may, for example, include those packets (including any index marker packets) which were stored in the transmit buffer, which were also part of the first plurality of packets. In other words, the second plurality of packets may include duplicates of some of the first plurality of packets. As noted above, this may be desirable in order to avoid packet loss, as it may have been determined that not all of the first plurality of packets may have been received by the second device. However, it may also be desirable to provide the second device with a relatively simple means for identifying and removing (i.e., duplicate copies of) packets that were successfully received on both the first transmission medium and the second transmission medium.

As noted above, a buffer-end marker packet may be transmitted to the second device on the second transmission medium. The buffer-end marker packet may be transmitted to the second device after transmitting the at least a subset of the first plurality of packets included in the second plurality of packets. In other words, the buffer-end marker packet may be transmitted to the second device after all of the buffered packets have been re-transmitted, e.g., in order to indicate to the second device that all of the buffered packets (i.e., which might duplicate packets in the first plurality of packets transmitted on the first transmission medium) have been transmitted and subsequent packets may not duplicate previously transmitted packets.

Additional packets (i.e., non-duplicate packets) of the first stream may also be transmitted to the second device on the second transmission medium after the end of the buffered packets. In some embodiments, additional packets may be used to regulate (e.g., self-throttle) transmission of the packets in the duplicate buffer. For example, in one set of embodiments, an additional packet of the first stream may be received for transmission to the receiver. The additional packet may be stored in the buffer (e.g., at a tail of the buffer) for transmission after the second plurality of packets. A pre-selected number of packets from a head end of the buffer may then be re-transmitted on the second transmission medium based on receiving the additional packet of the first stream for transmission to the receiver. In other words, the additional packet may be used as an automatic timer mechanism to release packets from the buffer, in order to avoid overloading the receiver with a potentially large number of packets (e.g., the packets which may need to be re-transmitted due to failure of the first transmission medium) in a short amount of time. It should be noted that such a self-throttling mechanism may be optional and/or may alternatively (or additionally) be implemented in the receiver, as described with respect to FIG. 7.

As noted above, in some embodiments, a buffer-end marker packet may not be transmitted. In this case the buffer-begin packet may include information indicating the buffer size, in which case a buffer-end packet would be extraneous. Alternatively, in some embodiments, there may be no indication provided to the second device that re-transmission of buffered packets has been completed. For example, if the index marker packets are inserted in the first stream at regular intervals, they may provide sufficient basis for the second device to identify and discard any duplicate packets without any need for a buffer-end (or, in some embodiments, a buffer-begin) marker packet.

Figure 7:
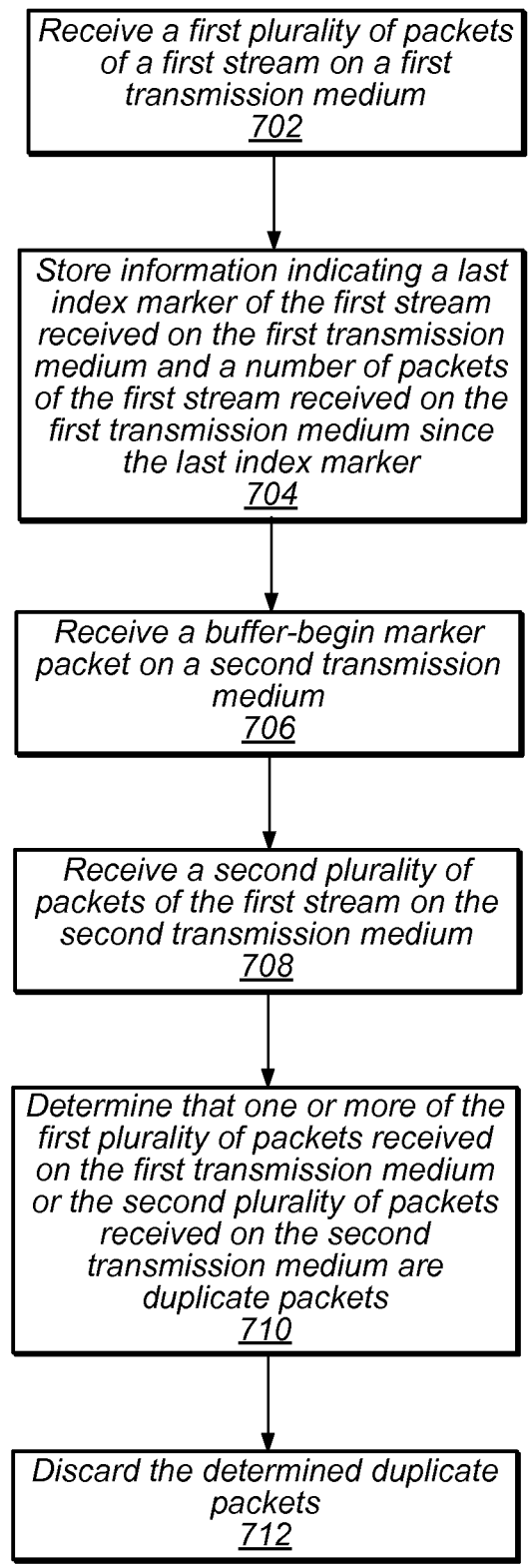

FIG. 7 is a flowchart diagram illustrating a method for a device to remove duplicate packets received from a second device. The method of FIG. 7 may be used primarily in "fail-over" situations, i.e., situations in which a transmission medium has failed (i.e., has undergone a significant or total loss in communication capability). However, part or all of the method of FIG. 7 may also or alternatively be used in normal load-balancing situations, i.e., in which both the original transmission medium and the new transmission medium are capable of being used for communication.

The device implementing the method may be coupled to the second device via a plurality of transmission media; for example, the first and second devices may be two of the devices shown in FIG. 1, in some embodiments. The system implementing the method may be a system such as shown in FIG. 2 and described with respect thereto, in some embodiments. The system may implement an OSI protocol stack such as shown in FIG. 3 and described with respect thereto. For example, in one set of embodiments, the method may be implemented at the hybrid adaptation layer 310, e.g., by hybrid control entity 212 and/or hybrid bridge 214. In other embodiments, the method may be implemented at another layer or several layers (e.g., each of several layers may implement elements of the method). The method may be performed as follows.

In 702, a first plurality of packets of a first stream may be received on a first transmission medium. The first plurality of packets may include one or more index marker packets. Each index marker packet may include an index number. For example, in some embodiments, an initial index marker packet may have an index number of 1 (or any other number, as desired), and each subsequent index marker packet may have an index number which is incremented by one relative to the index number in the index marker packet previous to it. The index marker packets may be located in the first stream at regular or irregular intervals. In one set of embodiments, an index marker packet may be located in the first stream every n packets, where n may be 50, 100, 1000, 5000, or any other number, as desired. In some embodiments, the value of n may not be fixed, and may be varied on some intervals or even every interval.

In 704, information indicating a last index marker received in the first stream on the first transmission medium and a number of packets of the first stream received on the first transmission medium since the last index marker may be stored. In some embodiments, e.g., if the index markers are located at relatively short and/or irregular intervals, information indicating index numbers of multiple previously received index marker packets may be stored, possibly along with information indicating a number of packets received between those index marker packets.

In 706, a buffer-begin marker packet may be received on a second transmission medium. In some embodiments, the buffer-begin marker packet may include information identifying an index marker packet and indicating a position of the buffer-begin marker packet in the first stream relative to the identified index marker packet. For example, in some embodiments, a buffer-begin marker packet for a stream may include the index number of the last index marker packet of the stream prior to the first packet in the buffer, and the number of packets in the stream between that index marker packet and the first packet in the buffer. This may allow the second device to identify and discard any duplicate packets regardless of whether the index markers are inserted at regular (e.g., predictable) intervals, as the second device may only need to track one or more recently received index marker packet index numbers and the number of packets received since those one or more recently received index marker packets. In some embodiments, the buffer-begin marker packet may also include information indicating a size of the buffer.

In 708, a second plurality of packets of the first stream may be received on the second transmission medium. The second plurality of packets may include at least a subset of the first plurality of packets, and may include at least a subset of the one or more index marker packets. The second plurality of packets may, for example, include packets (including any index marker packets) which were stored in a transmit buffer by the second device, which were also part of the first plurality of packets. In other words, the second plurality of packets may include duplicates of some of the first plurality of packets.

A buffer-end marker packet may also be received by the first device on the second transmission medium in some embodiments. The buffer-end marker packet may be received by the first device after receiving the at least a subset of the first plurality of packets included in the second plurality of packets. In other words, the buffer-end marker packet may be received by the first device after all of the buffered packets have been received and may indicate to the first device that all of the buffered packets (i.e., which might duplicate packets in the first plurality of packets received on the first transmission medium) have been transmitted and subsequent packets may not duplicate previously transmitted packets. It should be noted, however, that in some embodiments a buffer-end marker packet may not be necessary or desirable, e.g., if the buffer-begin marker packet includes information indicating the size of the buffer which is being transmitted. In this case, the receiver may be able to determine when the entirety of the buffer has been received based on the information included in the buffer-begin marker packet. This may be desirable in order to avoid the additional overhead embodied in the buffer-end packet.

Additional packets (i.e., non-duplicate packets) of the first stream may also be received by the first device on the second transmission medium after the buffered packets. In some embodiments, additional packets may be used to regulate (e.g., self-throttle) processing (e.g., forwarding to upper protocol layers) of the buffered packets, e.g., if a large number of packets are received in a short amount of time. This may be desirable in order to avoid overloading one or more of the upper protocol layers, which could potentially cause packet loss.

For example, in one set of embodiments, at least some of the second plurality of packets may be stored in a receive buffer, e.g., prior to processing. An additional packet of the first stream may be received on the second transmission medium, and may be stored at a tail end of the receive buffer. Based on receiving the additional packet of the first stream, a pre-selected number of packets from the head end of the receive buffer may be processed (e.g., forwarded to an upper protocol layer) and removed from the head end of the buffer. Thus, in some embodiments, the additional packet may be used as an automatic timer mechanism to release packets from the buffer. Reception of each further additional packet may release an additional pre-selected number of packets from the head end of the receive buffer, according to one set of embodiments, until the receive buffer is empty.

Additionally, it should be noted that in some embodiments, buffer marker packets may not be used at all, as in some embodiments, index marker packets may provide sufficient basis (e.g., if inserted at regular intervals) for the second device to determine whether duplicate packets have been received and to identify and discard such duplicate packets.

In 710, it may be determined that one or more of the first plurality of packets received on the first transmission medium or the second plurality of packets received on the second transmission medium are duplicate packets. Determining that one or more of the first plurality of packets received on the first transmission medium or the second plurality of packets received on the second transmission medium are duplicate packets may be based at least in part on the one or more index marker packets. In some embodiments, the determination may be made based partly on the stored information indicating a last index marker packet of the first stream received on the first transmission medium and a number of packets of the first stream received on the first transmission medium since the last index marker packet of the first stream was received on the first transmission medium. For example, if the index marker packets are inserted at regular intervals, comparing a first index marker packet received on the second transmission medium and a number of packets received on the second transmission medium before receiving that index marker packet to the last index marker packet received on the first transmission medium and the number of packets received since that index marker packet on the first transmission medium may provide an indication of whether there are any duplicate packets, and how many, and which packets are duplicate packets. However, this process may require waiting until an index marker packet is received on the second transmission medium, which may be inefficient.

Alternatively, if a buffer-begin marker packet is received prior to any content packets of the first stream on the second transmission medium, the information in the buffer-begin marker packet identifying its location in the stream may be used to immediately detect the presence of duplicate packets. For example, in some embodiments, the stored information indicating the last index marker packet received and the number of packets received since the last index marker packet on the first transmission medium may be compared to the information indicating a position of the buffer-begin marker packet in the first stream relative to a most recent index marker packet to determine whether any of the first plurality of packets or the second plurality of packets are duplicate packets of each other.

In 712, the determined duplicate packets may be discarded. The discarded duplicate packets may be the copies of the duplicate packets received on either of the first or second transmission media, as desired. In one set of embodiments, if packets of the first stream continue to be received on the first transmission medium after a buffer-begin marker packet has been received, and those packets are after the location of the buffer-begin marker packet in stream packet ordering, those packets may be discarded (e.g., because it may be assumed that they will be re-transmitted on the second transmission medium). On the other hand, if, when the buffer-begin marker packet is received, packets of the first stream have already been received on the first transmission medium up to a point past the location of the buffer-begin marker packet in stream packet ordering, packets of the first stream which are received on the second transmission medium may be discarded until non-duplicate packets (i.e., packets which hadn't already been received on the first transmission medium and processed) are received. At that point, the first stream may be fully switched to the second transmission medium. Information may continue to be stored indicating one or more index marker packets recently received on the second transmission medium and a number of packets received since or between those recently received index marker packets, e.g., in case of a further re-assignment of the first stream to a new transmission medium at a later time, in some embodiments.

FIGS. 8-11 and Additional Considerations

FIGS. 8-11 and the following details provided in conjunction therewith and additional considerations relate to specific exemplary implementations which may be used in accordance with the methods of FIGS. 4-7. However, as will be recognized by those skilled in the art, the any number of different implementations, including different implementation details may be used in accordance with the methods of FIGS. 4-7, and accordingly the following considerations should not be considered limiting to the disclosure as a whole.

FIG. 8

Figure 8:
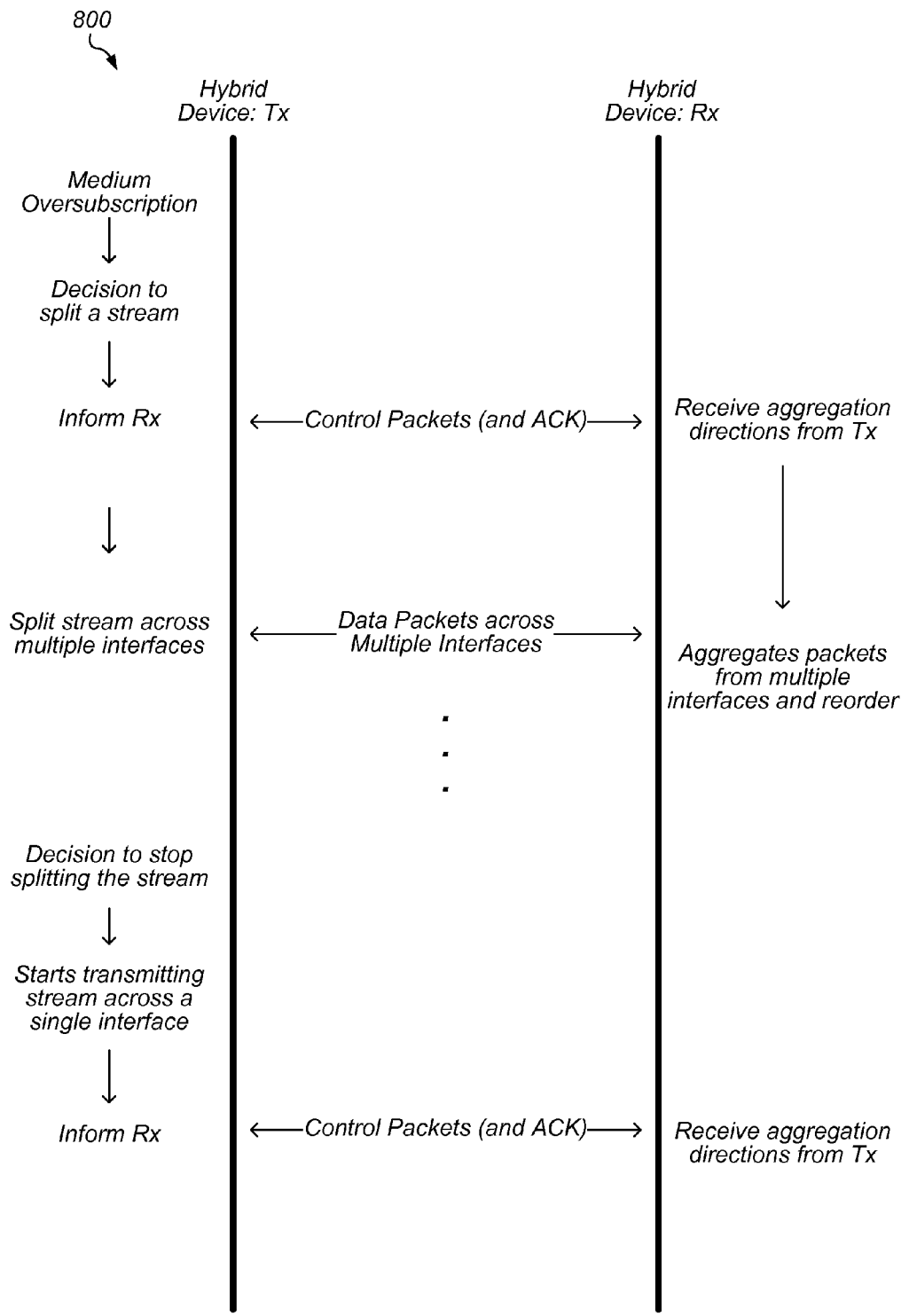
FIG. 8 is a communication diagram illustrating message flow between a transmitting device and a receiving device surrounding stream splitting/stream aggregation according to one embodiment.

FIG. 8 is a communication diagram illustrating message flow 800 between a transmitting device and a receiving device surrounding stream splitting/stream aggregation according to one embodiment.

Initially, an oversubscription event may be detected by the transmitting device. The device (e.g., a hybrid control entity operating in a hybrid networking layer, such as hybrid control entity 212 shown in FIG. 2, or another system element) may decide to split a stream. The device may inform the receiving device, e.g., by transmitting control packets indicating the decision to split the stream to the receiving device. The receiving device (e.g., a hybrid bridge operating in a hybrid networking layer, such as hybrid bridge 214 shown in FIG. 2, or another system element) may receive the control packets, which may include aggregation instructions (such as recommended aggregation buffer size, etc.), and acknowledge receipt of the control packets.

In some embodiments, the routing table used by the transmitting device to determine routing of newly received packets, including those of the stream selected for splitting, may be updated in accordance with the decision to split the stream. The transmitting device may then split the stream across multiple interfaces, e.g., by routing some packets of the split stream to a first transmission medium and some packets of the split stream to a second transmission medium. The proportions of the split stream which are routed to each of the selected transmission media may be maintained according to information stored in the routing table, in some embodiments.

Meanwhile, the receiving device may receive packets of the split flow on the multiple interfaces and aggregate and re-order the packets.

Eventually, the transmitting device may decide to stop splitting the stream. The transmitting device may subsequently begin transmitting packets of the stream using a single interface rather than multiple interfaces. The transmitting device may inform the receiving device by means of further control packets, which may be received and acknowledged by the receiving device.

Thus, according to some embodiments the transmitting device may send a command to the receiver when it modifies the split status of a flow, e.g., when it starts splitting a flow and when it stops splitting a flow.

The purpose of this information may be to enable the receiver to create a re-order buffer and start re-ordering a flow. Reordering may be relatively expensive (both in CPU and memory) and may potentially increase the delivery latency of a flow. Accordingly, it may be desirable for the receiver not to do so for all flows all of the time. Thus, in some embodiments, reordering (e.g., including setting up an aggregation buffer) may only be performed for flows which are transmitted across multiple media.

According to some embodiments, the control packets may also indicate a recommended buffer size and/or a recommended time-out. The transmitter may recommend an aggregation buffer size based on flow rate and relative latency of both interfaces on which stream is split. The receiver may typically obey the recommendation but may override depending on memory availability. The transmitter may also recommend the time-out based on flow rate and relative latency of both interfaces on which stream is split. Again, the receiver may typically obey the recommendation but may override depending on memory availability.

FIG. 9

Figure 9:
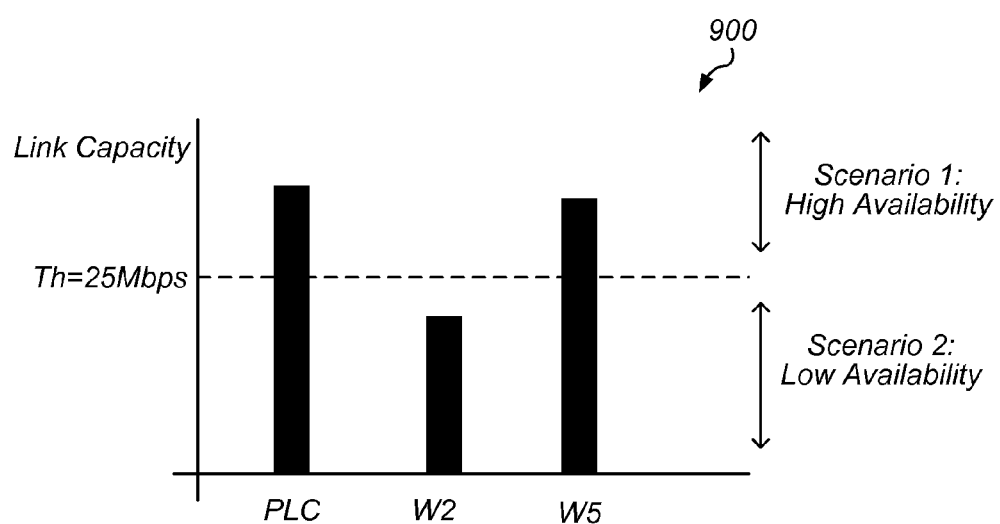
FIG. 9 is a chart illustrating hypothetical link capacities of various transmission media according to different scenarios according to one embodiment.
Figure 10:
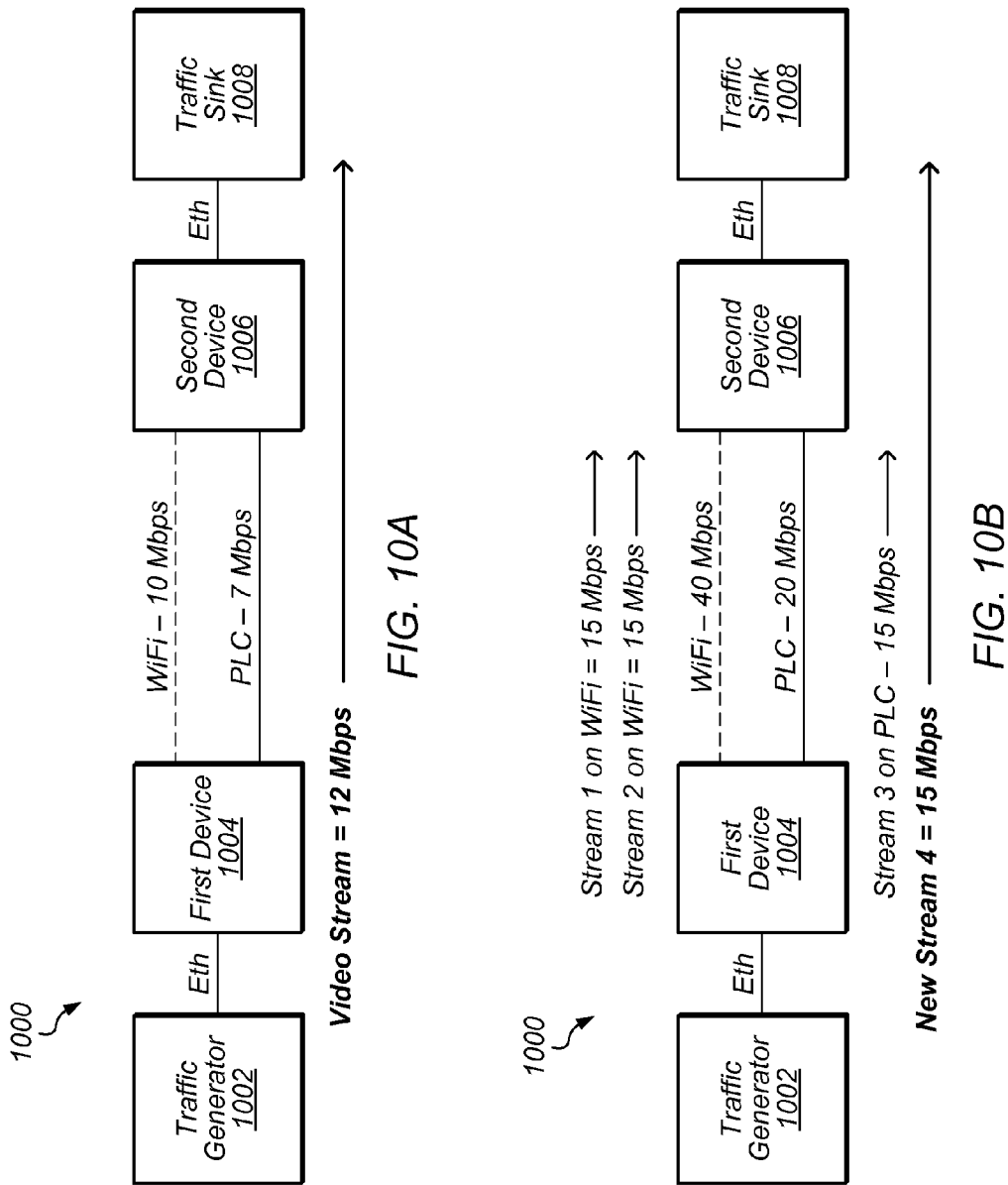
FIGS. 10A-B are block diagrams illustrating scenarios in which stream splitting/stream aggregation may be implemented according to one embodiment.

FIG. 9 is a chart 900 illustrating hypothetical link capacities of various transmission media according to different scenarios according to one embodiment. In the illustrated embodiment, there are three available transmission media: PLC, Wi-Fi operating in the 2.4 GHz spectrum (W2), and Wi-Fi operating in the 5 GHz spectrum (W5). PLC and W5 currently have a link capacity greater than 25 Mbps, which in the exemplary embodiment has been set as the threshold above which a transmission medium is considered as having more than sufficient capacity for adding new traffic (e.g., a new stream). W2 does also have some available link capacity, but less than 25 Mbps, in the illustrated embodiment.

The scenario shown, in which multiple transmission media have sufficient link capacity to support new traffic, may be referred to as "high availability". In this situation, there may be greater freedom to select the most appropriate transmission media for new streams based on matching characteristics of the streams themselves. For example, streams with high-priority and/or certain specific types of content (e.g., voice, video) may be preferably assigned to a faster and/or more reliable transmission medium, while streams with low-priority and/or certain specific types of content (e.g., data downloads) may be preferably assigned to a slower and/or less reliable transmission medium (e.g., in order to reserve the faster and/or more reliable transmission media for higher priority traffic).

A scenario in which no more than one transmission medium has a link capacity over the "high availability" threshold may be referred to, in contrast to the scenario shown, as "low availability". In this situation, at least in some embodiments, a new stream may simply be assigned to a transmission medium with a highest link capacity, and no special effort may be made to match characteristics of the new stream with a most-appropriate transmission medium.

FIGS. 10A-10B

FIGS. 10A and 10B illustrate scenarios in which packet aggregation may be desirable. One basic use-case is coverage: for example, in a home use scenario, aggregation may provide coverage to a corner of the house having insufficient bandwidth to support a single stream. In such a case splitting a stream across multiple interfaces will increase coverage. Packet aggregation may also be desirable in a variety of other scenarios.

As shown in FIG. 10A, in one embodiment a traffic generator 1002 may be coupled (e.g., via an Ethernet coupling) to a first device 1004. The first device may be coupled to a second device 1006 via Wi-Fi with a 10 Mbps connection and via PLC with a 7 Mbps connection. The second device 1006 may be coupled to a traffic sink 1008 (e.g., via an Ethernet coupling).

If the traffic sink 1008 were to initiate a video stream that requires 12 Mbps from traffic generator 1002, neither the Wi-Fi connection nor the PLC would have the capacity to support the video stream individually. However, if the stream were to be split, such that part of the stream were transmitted on the Wi-Fi link and part of the stream were transmitted on the PLC link, then the connections could jointly support the video stream.

FIG. 10B illustrates a scenario where sufficient bandwidth is available for several flows—however, the fraction of bandwidth remaining in each medium by stream assignment is insufficient to handle an additional flow. In this case, Wi-Fi provides a 40 Mbps connection while PLC provides a 20 Mbps connection, but Streams 1 and 2 each utilize 15 Mbps of the Wi-Fi connection and Stream 3 utilizes 15 Mbps of the PLC connection. Thus, Wi-Fi has 10 Mbps remaining link capacity while PLC has 5 Mbps remaining link capacity. Neither transmission medium could support new stream 4 (requiring 15 Mbps) individually, but by splitting the new stream, the transmission media could jointly support the new stream.

In some embodiments, the main performance limitation (CPU utilization) due to packet aggregation may be reordering of packets on the receiver side. Given a limited CPU this provides a trade-off of the maximum size of the aggregated stream and the total non-aggregated traffic which can be supported while aggregating one stream. Accordingly, in some embodiments, it may be desirable to limit the size of aggregated streams, possibly including different stream size limits depending on how much non-aggregated traffic is present. As one example, with no other traffic an aggregated stream of up to 30 Mbps may be supported, while with up to 50 Mbps of other traffic, an aggregated stream of up to 20 Mbps may be supported. Of course these are just examples, and different limits (or no limits) may be used if desired.

Additionally, since the cost (e.g., the CPU cost) of receiving an aggregated stream may be higher than the cost of receiving a non-aggregated stream, in some embodiments it may be desirable to minimize the number of aggregated streams should. For example, in one set of embodiments, it may be desirable to split at most one stream if there are two available transmission media and two streams if there are three available transmission media.

In other words, in some embodiments, situations in which two streams originating from the same device (with two mediums) will be split across both mediums may be avoided. This may not constrain the usability: it may always be possible to convert more than one stream split across two interfaces to all but one stream running on a single interface. The same logic may apply to devices with three available mediums.

It should be noted that in some embodiments, aggregation may be done between hybrid devices (e.g., as opposed to between sources and sinks). The decision to aggregate (i.e. to split a stream across multiple interfaces) may be made at the source hybrid device. In some embodiments, all hybrid decisions may be made at the source hybrid device.

FIG. 11

Figure 11:
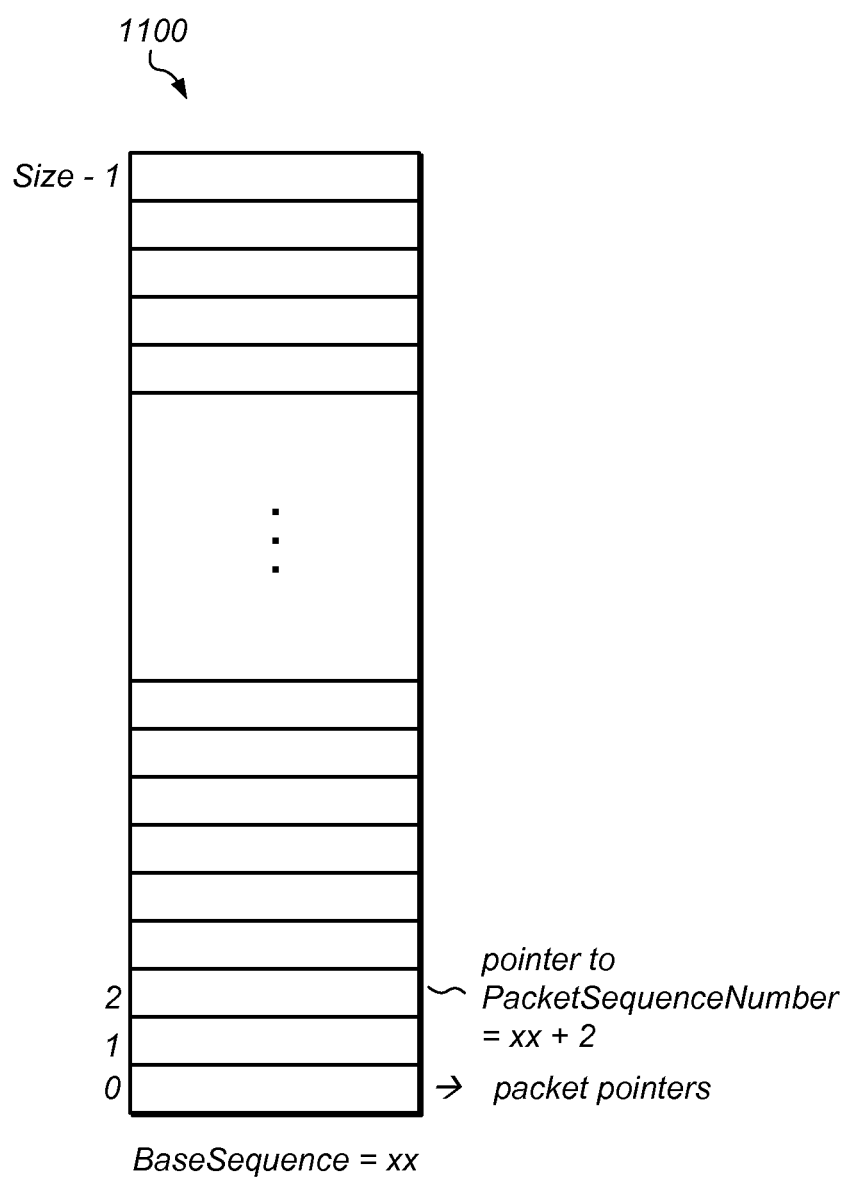
FIG. 11 is a diagram illustrating a circular buffer which may be used by a receiving device to maintain packet ordering of an aggregated packet stream according to one embodiment.

FIG. 11 illustrates an aggregation (re-ordering) buffer 1100 according to one embodiment. The transmission latency of Wi-Fi and PLC (among other possible communication interfaces) may be different and so it is possible that even if all packets are delivered correctly, they may be delivered out-of-order, which may not be desirable.

Re-ordering the packets may require a re-ordering buffer. The size of this buffer may be configurable, e.g., based on flow rate and relative latency of both interfaces on which the stream is split and memory availability. Note that in reality this process may not strictly be a re-ordering process but rather a re-combining in the correct order process, since the two underlying streams being re-combined are in-order internally.

The re-ordering buffer may include pointers to received packets which have not been delivered yet to the upper layers. The BaseSequence variable may include the packet sequence number corresponding to index 0. The re-ordering buffer may be implemented as a circular buffer. According to one embodiment, when a packet is received the following logic may be executed:

If (PacketSequenceNumber<BaseSequence), the received packet is an old out-of-sequence packet (e.g., possibly a timed-out packet). The packet may be dropped, or delivered, depending on the implementation, as desired.

Alternatively, if (PacketSequenceNumber<BaseSequence+Size), the packet may be within the buffer. The packet may be stored at an appropriate location in the buffer. A pointer to the packet may be placed at the index (PacketSequenceNumber−BaseSequence). If that index is already non-NULL (e.g., a packet pointer already exists in that location) then the packet may be discarded (e.g., because it may be a duplicate packet). Any in-sequence packets may then be delivered: if the buffer index 0 contains a packet pointer, the packet may be delivered and the index may be reset to NULL. The circular buffer pointer may be moved forward by one, and the BaseSequence variable may also be incremented. This may be repeated until the buffer index 0 is NULL (e.g., does not contain a pointer to a packet), e.g., indicating that the next packet in the sequence has not yet been received.

Alternatively, if (PacketSequenceNumber>=BaseSequence+Size), the packet may be outside of the buffer but newer; this may be an indication that the buffer is too small, for example. In some embodiments, enough packets may be delivered to bring this new sequence number into the buffer, regardless of whether or not there are holes in the sequence.

The re-ordering buffer may also incorporate a time-out mechanism. After a programmable timeout packets may be delivered to the upper layers, even if there are holes in the sequence. In some embodiments, the timeout mechanism may include maintaining a record of the receive timestamp of each packet. Note that, in some embodiments, it may be desirable that the timestamp be a RX time rather than an inherent time-stamp. The timeout mechanism may further include maintaining the timestamp of the first available packet in the buffer, e.g., the packet past the first gap. If the timestamp of the first available packet is timed-out (i.e. larger than timeout value), it (and any other timed-out packets) may be delivered.

Note that there may never be a packet at index 0 since it would be forwarded to the networking stack. Note also that this may be a relatively expensive operation since to compute this value one must step through the first gap to search for the first packet.

It should be noted, with respect to initial sequence numbers, that both TCP and RTP may randomize the initial sequence number to prevent sequence number prediction attacks. In some embodiments, the transmitter and receiver at the hybrid level may not control this sequence number. However, in some embodiments, stream splitting and aggregation may be activated after a stream has started flowing. Additionally, aggregation may be activated explicitly; for example, a transmitter may send a command to the receiver indicating that a stream (including a stream identifier) is about to be split. This may allow the receiver to identify the currently running sequence number before splitting starts, alleviating any potential problems that could be caused by randomized initial sequence numbers.

It should be noted that the above-described circular buffer, utilizing packet sequence numbers, may not be used in many embodiments. For example, any number of other circular buffer techniques, or other aggregation buffering techniques, may be used as desired. Embodiments of the switch marker technique described elsewhere herein represent one possible alternative (or complementary) option for aggregation re-ordering.

Additional Considerations

Data Structures

As previously noted, a device implementing elements of this disclosure may store information in one or more memories in some embodiments. The information may be stored in one or more data structures, in one set of embodiments. For example, in one set of embodiments, a routing table may be maintained, in which information identifying active streams and various characteristics (e.g., routing information) thereof may be stored. For example, such a routing table might include, for each of a plurality of streams, a stream identifier, the destination address (DA) of the stream, a type of the stream, a priority level, and one or more assigned interfaces (e.g., implicitly or explicitly including transmission medium/media). In some embodiments, e.g., for streams which are split between multiple interfaces, the routing table may also include information indicating which of the multiple assigned interfaces is currently being used to transmit the stream, burst sizes to be used on each assigned interface, and/or how many packets remain in the current burst being transmitted on the currently used interface.

In addition, a table may be maintained that indicates a current preferred order of transmission media for each of one or more destination addresses and/or types of streams. This table may be updated regularly, e.g., based on changes in media utilization rates, link capacities, etc. The routing table may also be regularly updated, e.g., based on any routing changes (e.g., as a result of load balancing, fail-over, split streams, stream completion, or for any other reason).

Burst Sizes

It should be noted that in some embodiments, it may be desirable to limit the size of bursts, since a large burst may limit simultaneous use of multiple interfaces, which may run counter to the goals of stream splitting/aggregation according to some embodiments.

For example, a stream running at 10 Mbps with packet size of 1400 bytes translates to 892 pps (packets per second). A burst of 255 packets would translate to 0.28 seconds. In other words, in this case a medium is being used for 0.28 seconds while the other medium is not being used.

Device Capability Discovery

Whenever a decision to split a stream is made it may be important to be aware of the destination device's capabilities. For example, the destination hybrid device may be a legacy device which does not support aggregation.

Devices may advertise capabilities as part of their topology discovery packets. For example, a portion of one or more control packets may be allocated to declare support for aggregation. In some embodiments, devices may transmit this information and maintain a database of such information for all devices on the network to be used during load-balancing decisions.

Packet Loss Minimization and Duplicate Packet Removal

Embodiments of the disclosure relate to systems in which multiple transmission media are available for transmission of a stream, and various techniques relating to such systems. Many of the embodiments relate to switching stream flows from one transmission medium to another transmission medium. Several packet flow disruptions are possible due to such path switches, including packet loss, packet duplication, and out of order packet delivery.

While different networking protocols and applications react differently to such packet flow disruptions, in general there are side-effects. For example, TCP/IP will throttle throughput in response to any of the above, and some video applications may display a visual glitch. To provide a seamless experience to the end-user all of these disruptions must be minimized or eliminated where possible.

Hybrid systems may switch flows under two scenarios: fail-over, when an interface fails and all streams from it are switched to another interface, and load balancing, when a medium is over-subscribed and one or more streams are switched from it to another interface.

Note that it is possible for the hybrid system to consider an interface to be "failed" even when it is still up and transmitting some packets. For example, for some interfaces, the hybrid system may consider it "failed" if its reported PHY rate falls below a threshold (e.g., 5 Mbps, or any other PHY rate).

Two common communication interfaces that may be available include Wi-Fi and powerline networks (e.g., HomePlugAV). Both the Wi-Fi driver and the HPAV driver may guarantee in-order delivery of packets from a particular stream. Both may buffer packets for transmission. According to some embodiments, external applications may be able to obtain information on which packets were transmitted successfully from a Wi-Fi driver, but not from a HPAV driver, and external applications may not be able to remove packets from the transmission buffer of either driver. Accordingly, packets in the transmission buffer will continue to be transmitted as long as a medium is alive (e.g., even if it is considered to have failed).

When an interface (truly) fails it may not be able to transmit any more packets from its buffer. All the packets in the buffer may be lost and so may any additional packets which are sent until the hybrid system determines that the interface has failed and starts transmitting packets on a new interface. A mechanism to reduce packet loss is to save a running window (buffer) of packets as they are transmitted on an interface and to (re)send them on the new interface when switching. In other words, whenever a path switch is triggered, these packets may be transmitted on the new interface.

According to some embodiments, such a feature may be implemented globally or on a per-stream basis. For example, each stream for which the feature is implemented may thus have its own buffer, with a buffer size (e.g., the number of packets that can be stored), and a buffer time window (e.g., specifying how far (in time) to keep packets from).

In order to implement the feature, according to one set of embodiments, when a packet is transmitted on an interface, its flow may first be identified. If the flow has buffering enabled, the packet may be appended to the buffer. The buffer may be stepped through (e.g., from head to tail) and packets may be removed if they are outside of the time window, if the buffer is too large, and/or if they have been successfully transmitted. Thus the buffer may be maintained as packets are transmitted.

When a flow is being switched from one medium to another, the buffer may be stepped through (e.g., from head to tail) and successfully transmitted packets may be discarded. Packets which are not known to have been successfully transmitted may be transmitted on the new interface.

It should be noted that determining whether packets have been successfully transmitted may only be available from some interfaces (e.g., Wi-Fi or other interfaces which provide access to this information). Thus, in some embodiments, this information may only be used for path switching from such an interface.

The buffer described above to be used for packet loss minimization may be used to transmit packets on the new interface whenever a path switch is executed. The number of packets in such a buffer may be dictated by how long it takes the hybrid system to detect an interface has failed—a process which may take several seconds, in some embodiments. Thus, in at least some embodiments, the buffer size may be >1000 packets. Any number of other (e.g., smaller or larger) buffer sizes may be used in other embodiments.

Transmitting >1000 packets through an interface (relatively) instantaneously may overwhelm the buffers of the drivers (Ethernet, Wi-Fi, embedded PLC). A mechanism to throttle these transmissions may accordingly be implemented. In some embodiments, the transmission may be throttled from outside the hybrid bridge so as not to block continued transmission. For example, the Token Bucket Filter queuing discipline (TBF qdisc) implements such throttling mechanism—whereby a maximum rate may be specified.

The above described transmit buffer re-transmission mechanism may serve to reduce packet loss. However, if the packets already went out on the air in the old interface then the receiver may receive duplicate packets. A relatively easy (partial) solution for this may be to remove from the buffer those packets which have successfully been transmitted (on the original interface). This may be possible for the Wi-Fi interface (as noted above), however it may not be possible for the HPAV interface (as also noted above). Even using this feature on Wi-Fi for a transition to another interface path may not fully address the problem since packets still in the buffer of the original (Wi-Fi) interface may not be removed and may keep being transmitted out if the interface is not truly dead.

A more complete, yet simplified (CPU cost-wise) solution may take advantage of several features of this particular duplicate scenario. In particular, advantage may be taken of the fact that: all packets transmitted on one interface are received in-order; once a decision has been made to switch from one interface to another all further transmissions on the original interface are stopped; and duplicates may only exist within the duplicate buffer (e.g., because that is the cause of the duplicates). Of course, this solution may also be advantageously used in other scenarios including different conditions in some embodiments.

A particular advantage of the method may be that the algorithm may not make any assumptions about the packets themselves. In other words, in some embodiments, no inspection of the data packets is done (specifically, no sequence numbers may be assumed to be embedded in the packets, in some embodiments).

The transmitter (data source) side functionality for implementing the method may include inserting an index marker ($M_I$) packet into the data stream every N packets. The index marker may include an index number, which may be incremented by one with each subsequent index marker packet. The index marker packet(s) may be inserted before the duplicate buffer. Thus, these index marker packets may be part of the duplicate buffer.

When executing a path switch, the duplicate buffer may be re-transmitted. Buffer marker packets ($M_B$) may be inserted at the beginning and/or the end the duplicate buffer on the new interface—$M_{B,B}$ and $M_{B,E}$ respectively. In the $M_{B,B}$, the index of the last index marker ($M_I$) packet outside the duplicate buffer may be included, as well as the number of packets from that stream removed from the buffer (whether because successfully transmitted or because aged-out or removed because of buffer size) since that index marker packet. This data pair may be referred to as ($I_T$, $L_T$).

The receiver (data sink) side functionality for implementing the method may include keeping track of index marker ($M_I$) packets. For example, the last index received and the number of packets of that stream received since that index marker may be stored. This data pair may be referred to as ($I_R$, $L_R$).

When receiving a beginning of buffer, buffer marker packet ($M_{B,B}$), any packet belonging to this stream coming in from alternate interfaces may be discarded. According to various embodiments, this blocking may be removed after a time interval (e.g., a programmable time interval) or may be kept until the next $M_{B,B}$ is observed (e.g., on the new interface).

In addition, the data pair ($I_T$, $L_T$) which was obtained from $M_{B,B}$ may be inspected and compared to ($I_R$, $L_R$). If $I_T==I_R$ and $L_T>=L_R$ then no packets may be dropped—there may be no duplicate packets on the new interface. If $I_T==I_R$ and $L_T<L_R$, the first $L_R-L_T$ packets may be dropped from the buffer, as they may have already been received on the original interface. If $I_T<I_R$, duplicate buffer packets may be dropped until an index marker packet with index $I_R$ is received. At that point, an additional $L_R$ packets may be dropped. If ($I_T>I_R$), then no packets may be dropped; this may indicate that the duplicate buffer wasn't big enough to handle the packet loss due to fail-over, and no duplicate packets have been received.

The above algorithm may take care of the two duplicate streams of data: packets arriving on the old interface after reception of duplicate buffer packets has begun, and packets which arrived on the old interface after fail-over but before reception of duplicate buffer packets.

According to some embodiments, a duplicate buffer enable/disable feature (as noted above) may also be used to control this feature. In other words, in some embodiments, index markers ($M_I$) may only be inserted if the duplicate buffer is enabled for the flow. Additionally, an index marker interval per stream parameter may be configurable in some embodiments. For example, one may want to dynamically adjust the index marker interval based on path characterization information.

The duplicate packet minimization procedure described above specifies that an index marker packet ($M_I$) may be inserted into the stream every N packets. Based on the above algorithm the value N may not need to be fixed and may be varied occasionally or on every interval, e.g., as long as correct count is kept of transmitted and received packets. The value N may also be independent of the size of the duplicate buffer. In some embodiments, for example, N may be very large. However, there may be a connection between Packet Error Rate (PER) and N and the number of duplicate packets received.

PER causes a packet to be dropped—that means the packet may be counted as transmitted but may not be counted as received. Every such missed packet may result in a duplicate packet being received. For example, if 10 packets are transmitted after a last $M_I$, $L_T=10$. However, if only 9 packets are received due to PER, $L_R=9$. In this case no packets will be removed at the receiver, which may result in a duplicate packet being received. The chance of a duplicate packet may thus be proportional to PER*N. Increasing N may accordingly increase the chances of receiving duplicates.

As noted above, the above-described packet loss minimization technique may require storing additional information which might not otherwise be necessary. The additional information stored on the transmit side may include a last index marker packet ($M_I$) index and a number of packets since last index marker packet, according to some embodiments.

The additional information stored on the receive side may include a last index marker packet index, a number of packets since the last index marker packet, and a stream interface (e.g., the interface on which stream is being received). In some embodiments, a block-mode flag may also be stored, indicating that all packets not received on the stream interface should be dropped. Additionally, information indicating whether or not an index marker packet is currently being searched for (and the index of that index marker packet) may be stored, and/or a counter indicating a number of packets to drop (e.g., based on a number of packets determined to be duplicates, as described above) may be stored.

As will be recognized by those skilled in the art, different implementations may include different stored information relating to packet loss minimization algorithms.

Quality of Service

Embodiments of this disclosure relate to a variety of techniques that may be used by a device configured to communicate using multiple transmission media. These techniques may in some embodiments be implemented without regard to content classification and differentiation for improved Quality of Service (QoS), if desired. However, Service providers may want to be able to differentiate between time-critical data (e.g. a Netflix video) and data which can be deferred (e.g. a file download), e.g., to ensure that customers are not upset that video on their television is of poor quality or that their voice transmissions are choppy—they would like to guarantee a Quality of Service. Retail customers may equally like to be able to stream internet video (e.g. Hulu or Netflix) without interference or delays. Even consumers of free content may expect Quality of Service guarantees/differentiation.

In non-Hybrid networks there is only a single medium on which data is transmitted. In Hybrid networks there may be multiple mediums which can be used to transmit data—each of which has different, and dynamically varying, characteristics. Thus the QoS problem obtains another dimension.

This section describes details of the QoS which may be delivered by Hybrid Networking Systems according to one set of embodiments. Included are descriptions of the desired behavior of the hybrid system (including the types of services which are identified (including paid and free video and others), and the actions of the system), and the implementation architecture and algorithms to deliver this functionality, according to one set of embodiments.

Note that there are two types of QoS. Prioritized QoS relates to tagging of packets with a priority level. Packets may be treated based on this priority (e.g., higher priority may be treated differently than lower priority). Parameterized QoS relates to reservation and guarantee of bandwidth by the medium. Packets belonging to streams with a bandwidth reservation are given highest priority (guaranteed) delivery.

While some mediums (e.g. MoCA) implement a type of Parameterized QoS, it may not be used in practice since it may require end-to-end bandwidth reservation and application level participation (to reserve bandwidth). This section accordingly focuses on Prioritized QoS.

QoS related behavior may be appropriate in a number of aspects of a hybrid network. Some of these aspects may include classification of data into different types of services (classes), tagging of data based on the classification, path selection and assignment of classified data to particular interfaces, fail over and re-assignment of flows, load balancing of traffic in cases of over-congestion, and stream prioritization of different data streams when there is insufficient bandwidth to support them all.

Classification of data may involve separating data packets into streams and classifying a stream as a particular type of service. Some possible types of services that may be classified according to one set of embodiments include internet streaming video, internet streaming audio, internet real time audio/video, and/or other types of services.

It should be noted that classification may include inspecting the content of packets rather than the container type. Thus content type classification may be possible with either IPv4 or IPv6 traffic.

It should also be noted that some types of traffic may not be classified because they may already be tagged according to their class. Examples of such types of traffic include IPTV, VoD (carrier provided Video on Demand), and VoIP.

Once data is classified as a particular type of traffic it may still need to be tagged. According to some embodiments, some system elements may be configured to make use of different levels of tag granularity. For example, a hybrid system may potentially be able to use a higher granularity of classification than network drivers. For example, in one embodiment, "video" might just have one tag, but the hybrid system may be configured to differentiate between IPTV, VoD, and OTT types of video.

As streams start up they may be assigned to default interfaces which are updated regularly. The algorithm for selecting the default interface may include initially considering the link capacity (LC) of each available medium. In a high availability scenario, sufficient link capacity to support new traffic (e.g. link capacity greater than a pre-configured or dynamic threshold, such as 25 Mbps, or any other threshold) may be available on multiple media. In this case, media (e.g., only considering those with LC greater than the LC threshold) may be selected based on a programmable order, e.g. "P52". In a low availability scenario, there may be no high link capacity media available. In this case the medium with the highest link capacity may simply be selected.

It should be noted that the programmable order of medium preference may be configurable per class of traffic. For example, the above example of "P52" might apply to IPTV and indicate that IPTV streams may preferably be assigned to PLC first, followed by Wi-Fi 5 GHz, and followed by Wi-Fi 2.4 GHz.

In some embodiments, the link capacity threshold for what is considered "high availability" may also be a configurable parameter per class of traffic. Of course, when streams start up it may not be known how much bandwidth they will require. This threshold allows for behavior to be customized per class of traffic. For example, according to one set of embodiments, it may be desirable that at least 25 Mbps of LC is available for IPTV, while for OTT an LC of 10 Mbps may be sufficient. It is also possible, to use a single threshold for all classes.

It should be noted that in some embodiments, a type of traffic may be excluded from some media. For example, if only some of the available transmission media are specified in a preferred order of transmission media (e.g., a preferred order of "25" for might mean that only Wi-Fi 2G and Wi-Fi 5G will be considered, and the flow will not be forwarded on the PLC interface even if both of Wi-Fi 2G and Wi-Fi 5G become disabled. In this case the flow may be dropped. This may or may not be a desirable option, depending on the implementation.

The path selection algorithm described above refers to link capacity. As noted above, the link capacity may be the amount of traffic which can be transmitted from a source point to a destination (typically measured in Mbps) on a particular transmission medium. It may take into account the physical characteristics of the link (e.g. PHY rate and PER) as well as the overall medium congestion. However, from a QoS point of view, it may be desirable to modify the link capacity to be class (priority) specific. For example, in some embodiments, link capacity may be defined as the amount of traffic for a particular priority class which can be transmitted from a source point to a destination (in Mbps). Thus for a particular hybrid device the link capacity may be a two-dimensional array: LC[DA][Priority].

Note that when a channel is idle all link capacities to a particular destination, i.e. LC[DA][*], are identical. But, when there is traffic on a medium, link capacity for high priority data may be higher than for low priority data—i.e. LC[DA][HIGH]>=LC[DA][LOW]. This may allow for the possibility of higher priority traffic pushing lower priority traffic out of the way.

In some embodiments, the number of supported priorities may be dictated by the underlying medium—for example, in one set of embodiments, it might be 4 for both Wi-Fi and PLC. Thus, in this case, even if higher granularity between two types of stream exists due to classification (e.g., being able to differentiate between IPTV and VoD), from the perspective of available link capacity they may be identical. Other numbers of supported priorities are also possible.

When one medium fails streams are re-assigned to other available mediums. According to one set of embodiments, for each stream on the failed interface, it may be determined whether the stream can be switched to an alternative interface. The path selection algorithm described earlier in this section may be used to find an alternative interface—i.e. if there are multiple mediums with sufficient bandwidth select between them based on the medium priority configuration for that priority class of the stream. Stream-specific link capacity may also be used. If there isn't sufficient capacity, a stream prioritization methodology may be used.

When a medium becomes over-congested (medium utilization crosses a threshold) some flows may need to be re-assigned to other mediums in order to relieve the congestion. According to some embodiments, high priority flows (such as IPTV/VoD/OTT/VoIP, according to one set of embodiments) should not be switched if possible, e.g., to avoid glitches. In other words, lower priority flows should be the first candidates for switching.

According to one set of embodiments, in order to load balance, starting from lower priority levels and moving to higher priority levels of streams on the over-congested medium, the following steps may be taken. The next stream with highest medium utilization may be selected. It may be determined whether the stream be switched to an alternative interface. This may include using the path selection algorithm described earlier in this section i.e. if there are multiple media with sufficient bandwidth select between them based on the medium priority configuration for that priority class of the stream. Stream-specific link capacity may also be used. If the stream cannot be switched, the next stream may be selected. If all streams of the lowest priority level cannot be switched, a stream with highest medium utilization at the next highest priority level may be selected. If there isn't sufficient link capacity for any stream to be switched, e.g., if other media are also over-congested, a stream prioritization methodology may be used.

When all media are over-congested and load-balancing cannot be performed, the quality of all streams on the media may be degraded. There are two possible over-congestion scenarios: there may be a mixture of higher and lower priority streams causing over-congestion, or a set of streams with equal priority may be causing over-congestion.

Depending on which scenario is occurring, a variety of configurable actions are possible. For mixed priority streams, lower priority streams may be dropped. If necessary/possible, a finer granularity of prioritization may be used. For example, variations in priority between different types of video streams (e.g., IPTV vs. VoD vs. OTT, etc.) may be used if possible. An alternate option may be to throttle TCP stream throughput. However, characterization of Video TCP streams (e.g., OTT or VoD streams) may be desirable to understand the throughput vs. time characteristics of such streams. For example, it may preferable not to throttle video TCP streams, in some embodiments.

For equal priority streams, a variety of options exist. One possibility is to drop a flow which consumes the most resources relative to its bit-rate. In some embodiments, flow priority may be configured per destination address; for example, traffic to a living room TV may have higher priority over traffic to a bedroom TV. Capping TCP stream throughput may be an option. Another possibility is to drop the youngest flow. However, in some embodiments, fast channel-switch may be one possible cause of oversubscription, e.g., if a user switches from one IPTV channel to another. Both streams may run concurrently during the switch (so that a "black-screen" doesn't appear) and the end-device may select the correct (e.g., youngest) stream to display. However, in case of resource contention the new stream should receive resources preferentially over the older stream. Thus, if there are multiple flows going to the same end-device, the oldest flow may be dropped.

According to one set of embodiments, additional QoS-specific constraints may be placed on packet aggregation if desired. For example, lower priority streams may be split/aggregated rather than high priority streams if possible. In addition, a configurable parameter may be provided to permit specifying that some traffic types will never be aggregated.

Note that it may be desirable to never split/aggregate VoIP streams (e.g., because of the potential for glitching), in some embodiments. However, in many embodiments, such streams may utilize very little bandwidth and accordingly may generally not be preferred candidates for splitting/aggregation.

As noted above, path characterization including QoS considerations may utilize an enhanced link capacity per destination and priority level. At the implementation level this may translate into medium utilization per priority level, since that may be used to determine available link capacity from the raw link capacity, according to some embodiments.

It should be noted that channel access may depend on the interactions of multiple nodes and the priority of the traffic they have to send. For PLC this access may be fully coordinated and has strict priority. For Wi-Fi this may be statistical access—where higher priority traffic has a higher chance of accessing the channel. The access within the node may still be by strict priority (e.g., when a node has multiple classes of traffic to send it may do so with strict priority) no matter what the transmission interface is.

According to some embodiments, three Quality of Service levels may be supported. These may include high priority (e.g., expedited forwarding), medium priority, and normal priority. For example, in one set of embodiments, videos, voice over IP, or any other custom stream which needs to be delivered with minimum packet loss and low latency may be assigned high priority. Medium priority may be assigned to any other higher priority traffic, while normal priority (best effort) may be assigned to any other traffic types.

According to some embodiments, hybrid control packets may be used for various hybrid control functions. These may be extremely important for the correct behavior of the system (topology discovery, path characterization, etc.), at least in some embodiments. Accordingly, if the control packets do not arrive to their destination due to network congestion, the hybrid functionality may be impaired. Therefore, according to some embodiments, hybrid control packets may typically have the highest priority available.

An exception to this may be marker packets (e.g., buffer-begin/buffer-end, beginning-of-stream/end-of-stream, and/or index marker packets). According to one set of embodiments, marker packets may mimic the flow they are attached to, in order to keep them in right order with their flow. The mimic may include identical prioritization, destination address, and/or other characteristics.

Bi-Directional Data

It should be noted that in some embodiments, a feature forcing all traffic of a particular TCP flow to flow on a single interface may be implemented. This may be done out of concern that if the data and ACK streams were on different interfaces the latency difference could trigger TCP to throttle the flow.

In some embodiments, the path selection scheme described herein may assume that every device makes decisions on path selection and switching (due to fail-over or load-balancing) independently of every other device. In particular every device may make these decisions for streams which originate from itself or which are bridged through it (e.g., streams which the device originates for the next portion of the streams' path). If there are multiple data streams between two devices in either direction each may be assigned to a medium, and switched as needed, independently of the other streams.

However, for some high level protocols, such as IP/TCP, multiple streams in different directions are actually associated with each other functionally. For example, in the case of IP/TCP, TCP data may flow in one direction while TCP ACKs corresponding to this data flow in the other direction. Many networking protocols may be designed to optimize the performance of such dependent bi-directional traffic, e.g., by reducing the turn-around time. According to some embodiments, such optimization by the underlying media may only be done if all dependent streams are using the same medium. Thus, in some embodiments, for IP/TCP streams (and/or other streams with associated bi-directional traffic), such streams may be identified and all dependent streams may be guaranteed use of the same medium.

One possible mechanism to accomplish this may include a transmitting device explicitly informing a receiving device that a stream may have an associated "slave" stream which should utilize the same transmission medium as the "master" stream. The transmitting device may inform the receiving device via one or more control packets or via another means.

Another possible mechanism to accomplish this may include a receiving device detecting and identifying such streams. For example, the receiving device may identify a streams based on an inspection of the first received packet of a stream. If the inspection indicates that the packet is of a type for which an associated stream in the opposite direction may be generated, the receiving device may store information indicating that the receiving device should not make any path selection or load-balancing decisions for that stream. It should be noted that the receiving device may also store information indicating that the stream is a "slave" stream (e.g., for which no path selection or load-balancing decisions should be made locally) in the above-described mechanism in which the transmitting device explicitly informs the receiving device of the nature of the stream.

Thus, in one set of embodiments, a first plurality of packets of a first stream may be received from a second device on a first transmission medium. It may be determined that a second stream may be generated in association with the first stream, where the second stream is for transmission to the second device. In some embodiments, an indication that the second stream may be generated in association with the first stream may be received from the second device. In this case, determining that the second stream may be generated in association with the first stream may be based on receiving the indication that the second stream may be generated in association with the first stream. Alternatively, the first device may determine that the second stream may be generated in association with the first stream independently of any indication from the second device, e.g., by inspecting one or more packets of the first stream to determine a packet type.

Information may be stored indicating that the first stream is assigned to the first transmission medium and the second stream is associated with the first stream. A second plurality of packets of the second stream may be transmitted to the second device on the first transmission medium, which may be based on the information indicating that the first stream is assigned to the first transmission medium and the second stream is associated with the first stream.

In some embodiments, the second plurality of packets of the second stream may be generated in response to receiving the first plurality of packets of the first stream. For example, in one set of embodiments, the first plurality of packets may include TCP data packets, while the second plurality of packets may include TCP ACK packets generated in response to the TCP data packets.

It should be noted that streams with associated reverse-direction streams may present additional issues with respect to stream splitting and aggregation. In this case, such streams may either be exempted from stream splitting, or (e.g., if possible) the protocol features causing the "slave" stream (e.g., the TCP ACK feature) may be disabled, according to various embodiments.

Self-Throttling

As described above according to some embodiments, some devices may implement a mechanism to help eliminate lost packets on fail-over by buffering packets on the transmit interface. This buffer may then be transmitted on the new interface in case of fail-over. Similarly, on the receive side packets may be buffered when they are detected on a new interface to guarantee in-order delivery. In the latter case, once it is detected that all packets have been received, the buffered packets may all be forwarded up the protocol stack. In either case a large number of packets may be transmitted in a short amount of time. This has the potential to cause packet loss due to memory exhaustion, in some embodiments.

One mechanism, briefly mentioned above, may include using well known throttling mechanisms (such as TBF) to limit the rate at which the packets are forwarded to their destination. However, these general purpose mechanisms may be complex—for instance, they may rely on additional timers to help regulate the rate at which packets are forwarded to their destination.

A simpler mechanism may include self-throttling. Since packets of a particular stream may continue to be transmitted and received after such an event, it may be possible to use such transmission or reception as timers for the forwarding of packets to their destination. For example, in one set of embodiments, a FIFO buffer may be implemented, in which new packets are placed at the tail of the buffer while a programmable number of older packets may be removed from the head and processed (e.g., forwarded to their destination). The buffer may eventually be exhausted, at which point the self-throttling phase may be complete. The self-throttling FIFO buffer may be implemented at either or both of the transmitter and/or receiver side, according to various embodiments, as desired.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method performed by a first device to transmit a stream of upper protocol layer packets to a second device, the method comprising:
    receiving the stream of upper protocol layer packets from an upper protocol layer;
    inserting index marker packets into the stream, wherein each of the index marker packets marks a relative position in the stream, the index marker packets being different from the upper protocol layer packets;
    transmitting a first portion of the stream including at least a first number of the index marker packets to the second device via a first transmission medium;
    after transmitting the first portion of the stream, determining to discontinue transmitting the stream via the first transmission medium and determining to transmit a second portion of the stream including at least a second number of the index marker packets via a second transmission medium, the second transmission medium different from the first transmission medium; and
    transmitting the second portion of the stream including the second number of index marker packets to the second device via the second transmission medium.

2. The method of claim 1, wherein inserting the index marker packets comprises:
    determining a regular interval for inserting the index marker packets into the stream; and
    inserting the index marker packets into the stream in accordance with the regular interval.

3. The method of claim 1, further comprising:
    storing a subset of the first portion of the stream in a buffer with corresponding index marker packets from the first number of index marker packets; and
    retransmitting the subset of the first portion of the stream and the corresponding index marker packets via the second transmission medium in response to determining to transmit the stream via the second transmission medium and prior to transmitting the second portion of the stream.

4. The method of claim 1, wherein determining to discontinue transmission of the stream via the first transmission medium comprises:
    determining that the first transmission medium has failed.

5. The method of claim 1, wherein inserting the index marker packets into the stream comprises inserting the index marker packets into the stream in accordance with irregular intervals of upper protocol layer packets.

6. The method of claim 1, wherein said inserting the index marker packets includes inserting the index marker packets at a lower protocol layer of the first device that is different from the upper protocol layer of the first device.

7. The method of claim 1, wherein the upper protocol layer comprises a user datagram protocol (UDP) layer.

8. The method of claim 1, wherein the second portion of the stream at least partially overlaps the first portion of the stream, and wherein the index marker packets enable the second device to detect duplicate upper protocol layer packets from the stream when the duplicate upper protocol layer packets are received via both the first transmission medium and the second transmission medium.

9. The method of claim 1, further comprising:
    retransmitting a subset of the first portion of the stream including corresponding index marker packets via the second transmission medium in response to determining that at least the subset of the first portion of the stream was not received by the second device via the first transmission medium.

10. The method of claim 1, further comprising:
    retransmitting a subset of the first portion of the stream including corresponding index marker packets to the second device via the second transmission medium,
    wherein the corresponding index marker packets enable the second device to detect and discard duplicate packets of the subset of the first portion of the stream transmitted via both the first transmission medium and the second transmission medium.

11. The method of claim 1, further comprising:
    transmitting a buffer-begin marker packet to the second device via the second transmission medium; and
    retransmitting a subset of the first portion of the stream via the second transmission medium,
    wherein the buffer-begin marker packet identifies a previous index number for a previous index marker packet and indicates a position of the buffer-begin marker packet relative to the stream based, at least in part, on the previous index number.

12. The method of claim 11, further comprising:
    transmitting a buffer-end marker packet to the second device via the second transmission medium after retransmitting the subset of the first portion of the stream via the second transmission medium, wherein the buffer-end marker packet indicates to the second device that subsequent upper protocol layer packets transmitted via the second transmission medium are not duplicates of the first portion of the stream.

13. The method of claim 11, the previous index marker packet comprises a most recent index marker packet transmitted with the first portion of the stream.

14. The method of claim 1, wherein inserting the index marker packets comprises generating the index marker packets to mimic a flow characteristic of the stream, such that the index marker packets will be routed in a same manner as the upper protocol layer packets.

15. The method of claim 14, wherein the flow characteristic comprises at least one member of the group consisting of a stream identifier, a destination address, a priority level, and a data type.

16. A first device, comprising:
    a first network interface configured to couple the first device to a first transmission medium;
    a second network interface configured to couple the first device to a second transmission medium;
    a processor; and
    memory for storing instructions which, when executed by the processor, cause the first device to:
        receive a stream of upper protocol layer packets from an upper protocol layer;
        insert index marker packets into the stream, wherein each of the index marker packets marks a relative position in the stream, the index marker packets being different from the upper protocol layer packets;

transmit a first portion of the stream including at least a first number of the index marker packets to a second device via the first transmission medium;

after transmitting the first portion of the stream, determine to discontinue transmitting the stream via the first transmission medium and determine to transmit a second portion of the stream including at least a second number of the index marker packets via the second transmission medium, the second transmission medium different from the first transmission medium; and transmit the second portion of the stream including the second number of the index marker packets to the second device via the second transmission medium.

17. The first device of claim 16, wherein the instructions, when executed the processor, cause the first device to:

determine a first interval for inserting the index marker packets into the stream; and insert the index marker packets into the stream in accordance with the first interval.

18. The first device of claim 16, wherein the instructions, when executed the processor, cause the first device to:

store a subset of the first portion of the stream in a buffer with corresponding index marker packets from the first number of index marker packets; and retransmit the subset of the first portion of the stream and the corresponding index marker packets via the second transmission medium prior to transmission of the second portion of the stream of upper protocol layer packets, wherein retransmission of the subset of the first portion of the stream of upper protocol layer packets occurs in response to a determination to transmit the stream via the second transmission medium.

19. The first device of claim 16, wherein the instructions to determine to discontinue transmission of the stream via the first transmission medium comprises instructions which, when executed by the processor, cause the first device to:

determine that the first transmission medium has failed.

20. The first device of claim 16, wherein the instructions, when executed the processor, cause the first device to:

transmit a buffer-begin marker packet to the second device via the second transmission medium; and retransmit a subset of the first portion of the stream of upper protocol layer packets via the second transmission medium, wherein the buffer-begin marker packet identifies a previous index number for a previous index marker packet and indicates a position of the buffer-begin marker packet relative to the stream based, at least in part, on the previous index number.

21. The first device of claim 20, wherein the instructions, when executed the processor, cause the first device to:

transmit a buffer-end marker packet to the second device via the second transmission medium after the retransmit of the subset of the first portion of the stream via the second transmission medium, wherein the buffer-end marker packet indicates to the second device that subsequent upper protocol layer packets transmitted via the second transmission medium are not duplicates of the first portion.

22. A system for transmitting a stream of upper protocol layer packets from a first device to a second device, the system comprising:

means for receiving the stream of upper protocol layer packets from an upper protocol layer means for inserting index marker packets into the stream, wherein each of the index marker packets marks a relative position in the stream, the index marker packets being different from the upper protocol layer packets;

means for transmitting a first portion of the stream including at least a first number of the index marker packets to the second device via a first transmission medium;

after transmitting the first portion of the stream, means for determining to discontinue transmitting the stream including at least a second number of the index marker packets via the first transmission medium and determining to transmit a second portion of the stream via a second transmission medium, the second transmission medium different from the first transmission medium; and means for transmitting the second portion of the stream including the second number of the index marker packets to the second device via the second transmission medium.

23. A non-transitory computer-readable memory medium comprising program instructions for transmitting a stream of upper protocol layer packets from a first device to a second device, wherein the program instructions are executable by one or more processors of the first device to cause the first device to:

receive the stream of upper protocol layer packets from an upper protocol layer;

insert index marker packets into the stream, wherein each of the index marker packets marks a relative position in the stream, the index marker packets being different from the upper protocol layer packets;

transmit a first portion of the stream including at least a first number of the index marker packets to the second device via a first transmission medium;

after transmitting the first portion of the stream, determine to discontinue transmitting the stream via the first transmission medium and determine to transmit the a second portion of the stream including at least a second number of the index marker packets via a second transmission medium, the second transmission medium different from the first transmission medium; and transmit the second portion of the stream including the second number of the index marker packets to the second device via the second transmission medium.

24. A method performed by a receiving device, the method comprising:

receiving a first portion of a stream of upper protocol layer packets and a first number of index marker packets via a first transmission medium, wherein each of the index marker packets marks a relative position in the stream;

receiving a second portion of the stream and a second number of the index marker packets via a second transmission medium in response to a change in transmission of the stream from the first transmission medium to the second transmission medium;

determining, based, at least in part, on index numbers of the index marker packets in the first number of the index marker packets and the second number of the index marker packets, that one or more duplicate upper protocol layer packets were received via the first transmission medium and via the second transmission medium; and discarding the one or more duplicate upper protocol layer packets and the index marker packets before processing the stream of upper protocol layer packets.

25. The method of claim 24, further comprising:

storing information indicating a last index marker packet received via the first transmission medium and a count of upper protocol layer packets received via the first transmission medium since the last index marker packet;

receiving a buffer-begin marker packet on the second transmission medium indicating that a subset of the first portion of the stream will be retransmitted via the second transmission medium, wherein the buffer-begin marker packet identifies a previous index number of a previous index marker packet and indicates a position of the buffer-begin marker packet relative to the stream based, at least in part, on the previous index number; and wherein determining that the one or more duplicate upper protocol layer packets were received via the first transmission medium and via the second transmission medium includes comparing the information indicating the last index marker packet received via the first transmission medium and the count of upper protocol layer packets received via the first transmission medium since the last index marker packet to the position of the buffer-begin marker packet relative to the stream.

26. The method of claim 25, the method further comprising:

receiving a buffer-end marker packet via the second transmission medium, wherein the buffer-end marker packet indicates that subsequent upper protocol layer packets received via the second transmission medium are not duplicate upper protocol layer packets of the first portion of the stream received via the first transmission medium.

27. The method of claim 25, wherein at least a first packet of the first portion of the stream is received via the first transmission medium after the buffer-begin marker packet is received via the second transmission medium, the method further comprising:

discarding the first packet received after the buffer-begin marker packet is received in response to a determination that the first packet is a duplicate of a second packet received via the second transmission medium after the buffer-begin marker packet.

28. A device, comprising:

a first network interface for coupling the device to a first transmission medium and configured to receive a first portion of a stream of upper protocol layer packets and a first number of index marker packets via the first transmission medium, wherein each of the index marker packets marks a relative position in the stream;

a second network interface for coupling the device to a second transmission medium and configured to receive a second portion of the stream and a second number of the index marker packets via the second transmission medium in response to a change in transmission of the stream from the first transmission medium to the second transmission medium;

a processor; and memory for storing instructions which, when executed by the processor, cause the device to:

determine, based, at least in part, on index numbers of the index marker packets in the first number of the index marker packets and the second number of the index marker packets, that one or more duplicate upper protocol layer packets were received via the first transmission medium and via the second transmission medium; and discard the one or more duplicate upper protocol layer packets and the index marker packets before processing the stream of upper protocol layer packets.

29. The device of claim 28, wherein the instructions, when executed the processor, cause the device to:

receive a buffer-end marker packet via the second transmission medium, wherein the buffer-end marker packet indicates that subsequent upper protocol layer packets received via the second transmission medium are not duplicate upper protocol layer packets of the first portion of the stream received via the first transmission medium.

30. The device of claim 28, wherein the instructions, when executed the processor, cause the device to:

store information indicating a last index marker packet received via the first transmission medium and a count of upper protocol layer packets received via the first transmission medium since the last index marker packet;

receive a buffer-begin marker packet on the second transmission medium indicating that a subset of the first portion of the stream will be retransmitted via the second transmission medium, wherein the buffer-begin marker packet identifies a previous index number of a previous index marker packet and indicates a position of the buffer-begin marker packet relative to the stream based, at least in part, on the previous index number; and wherein the instructions to determine that the one or more duplicate upper protocol layer packets were received via the first transmission medium and via the second transmission medium comprises instructions which, when executed by the processor, cause the device to compare the information indicating the last index marker packet received via the first transmission medium and the count of upper protocol layer packets received via the first transmission medium since the last index marker packet to the position of the buffer-begin marker packet relative to the stream.

31. The device of claim 30, wherein at least a first packet of the first portion of the stream is received via the first transmission medium after the buffer-begin marker packet is received via the second transmission medium, wherein the instructions, when executed by the processor, cause the device to:

discard the first packet received after the buffer-begin marker packet is received in response to a determination that the first packet is a duplicate of a second packet received via the second transmission medium after the buffer-begin marker packet.

32. A system for a receiving device, the system comprising:

means for receiving a first portion of a stream of upper protocol layer packets and a first number of index marker packets via a first transmission medium, wherein each of the index marker packets marks a relative position in the stream;

means for receiving a second portion of the stream and a second number of the index marker packets via a second transmission medium in response to a change in transmission of the stream from the first transmission medium to the second transmission medium;

means for determining, based, at least in part, on index numbers of the index marker packets in the first number of the index marker packets and the second number of the index marker packets, that one or more duplicate upper protocol layer packets were received via the first transmission medium and via the second transmission medium; and means for discarding the one or more duplicate upper protocol layer packets and the index marker packets before processing the stream of upper protocol layer packets.

33. A non-transitory computer-readable memory medium comprising program instructions for detecting and removing received duplicate packets, wherein the program instructions are executable by one or more processors of a receiving device to cause the receiving device to:

receive a first portion of a stream of upper protocol layer packets and a first number of index marker packets via a first transmission medium, wherein each of the index marker packets marks a relative position in the stream;

receive a second portion of the stream of upper protocol layer packets and a second number of the index marker packets via a second transmission medium in response to a change in transmission of the stream from the first transmission medium to the second transmission medium;

determine, based, at least in part, on index numbers of the index marker packets in the first number of the index marker packets and the second number of the index marker packets, that one or more duplicate upper protocol layer packets were received via the first transmission medium and via the second transmission medium; and discard the one or more duplicate upper protocol layer packets and the index marker packets before processing the stream.

34. A method for re-ordering out-of-order packets, the method comprising:

receiving, via a first transmission medium a first plurality of packets associated with a packet stream followed by an end-of-stream marker packet that is not associated with the packet stream;

receiving, via a second transmission medium, a beginning-of-stream marker packet that is not associated with the packet stream followed by a second plurality of packets associated with the packet stream;

buffering at least some of the second plurality of packets that are received prior to the end-of-stream marker packet;

processing the first plurality of packets and the end-of-stream marker packet; and processing the beginning-of-stream marker packet and the second plurality of packets after processing the end-of-stream marker packet.

* * * * *